United States Patent
David et al.

(10) Patent No.: US 10,012,518 B2
(45) Date of Patent: Jul. 3, 2018

(54) MAGNETIC FIELD SENSOR FOR SENSING A PROXIMITY OF AN OBJECT

(71) Applicant: Allegro MicroSystems, LLC, Worcester, MA (US)

(72) Inventors: Paul A. David, Bow, NH (US); Ravi Vig, Bow, NH (US)

(73) Assignee: Allegro MicroSystems, LLC, Manchester, NH (US)

( * ) Notice: Subject to any disclaimer, the term of this patent is extended or adjusted under 35 U.S.C. 154(b) by 0 days.

(21) Appl. No.: 15/176,645

(22) Filed: Jun. 8, 2016

(65) Prior Publication Data

US 2017/0356759 A1 Dec. 14, 2017

(51) Int. Cl.
| | |
|---|---|
| *G01D 5/14* | (2006.01) |
| *G01D 5/16* | (2006.01) |
| *G01P 3/488* | (2006.01) |
| *G01B 7/02* | (2006.01) |

(52) U.S. Cl.
CPC ............. *G01D 5/142* (2013.01); *G01B 7/023* (2013.01); *G01D 5/147* (2013.01); *G01D 5/16* (2013.01); *G01P 3/488* (2013.01)

(58) Field of Classification Search
CPC ...... G01D 5/142; G01D 5/145; G01D 5/2033; G01D 5/2241; G01B 7/00; G01B 7/14; G01B 7/30; G01R 33/02; G01R 15/20; G01R 15/202; G01R 21/08; G01R 33/06; G01R 33/07; G01R 33/077; G01R 33/09; G11B 2005/0016
USPC ....... 324/207.11, 207.13, 207.2, 207.21, 260
See application file for complete search history.

(56) References Cited

U.S. PATENT DOCUMENTS

| | | | |
|---|---|---|---|
| 3,195,043 A | 7/1965 | Burig et al. |
| 3,281,628 A | 10/1966 | Bauer et al. |
| 3,607,528 A | 9/1971 | Gassaway |
| 3,611,138 A | 10/1971 | Winebrener |
| 3,661,061 A | 5/1972 | Tokarz |
| 3,728,786 A | 4/1973 | Lucas et al. |
| 4,048,670 A | 9/1977 | Eysermans |
| 4,053,829 A | 10/1977 | Maruo |
| 4,188,605 A | 2/1980 | Stout |
| 4,204,317 A | 5/1980 | Winn |

(Continued)

FOREIGN PATENT DOCUMENTS

| | | |
|---|---|---|
| CH | 683 469 A5 | 3/1994 |
| CN | 102483443 A | 5/2012 |

(Continued)

OTHER PUBLICATIONS

Voluntary Amendment with English Calims dated Nov. 7, 2016 for Korean App. No. 10-2016-7004178; 15 Pages.

(Continued)

*Primary Examiner* — Tung X Nguyen
*Assistant Examiner* — Robert P Alejnikov, Jr.
(74) *Attorney, Agent, or Firm* — Daly, Crowley, Mofford & Durkee, LLP

(57) ABSTRACT

A back-biased magnetic field sensor uses one or more magnetic field sensing elements upon a substrate, each outside of a substrate region in which magnetic field lines are near perpendicular to the substrate and outside of which magnetic field lines are not to the substrate. The back-biased magnetic field sensor can sense an approaching and/or a retreating ferromagnetic object.

17 Claims, 7 Drawing Sheets

(56) References Cited

U.S. PATENT DOCUMENTS

| | | |
|---|---|---|
| 4,236,832 A | 12/1980 | Komatsu et al. |
| 4,283,643 A | 8/1981 | Levin |
| 4,315,523 A | 2/1982 | Mahawili et al. |
| 4,438,347 A | 3/1984 | Gehring |
| 4,481,469 A | 11/1984 | Hauler et al. |
| 4,573,258 A | 3/1986 | Io et al. |
| 4,614,111 A | 9/1986 | Wolff |
| 4,649,796 A | 3/1987 | Schmidt |
| 4,670,715 A | 6/1987 | Fuzzell |
| 4,719,419 A | 1/1988 | Dawley |
| 4,733,455 A | 3/1988 | Nakamura et al. |
| 4,745,363 A | 5/1988 | Carr et al. |
| 4,746,859 A | 5/1988 | Malik |
| 4,752,733 A | 6/1988 | Petr et al. |
| 4,758,943 A | 7/1988 | Aström et al. |
| 4,760,285 A | 7/1988 | Nelson |
| 4,764,767 A | 8/1988 | Ichikawa et al. |
| 4,769,344 A | 9/1988 | Sakai et al. |
| 4,772,929 A | 9/1988 | Manchester |
| 4,789,826 A | 12/1988 | Willett |
| 4,796,354 A | 1/1989 | Yokoyama et al. |
| 4,823,075 A | 4/1989 | Alley |
| 4,833,406 A | 5/1989 | Foster |
| 4,908,685 A | 3/1990 | Shibasaki et al. |
| 4,910,861 A | 3/1990 | Dohogne |
| 4,944,028 A | 7/1990 | Iijima et al. |
| 4,954,777 A | 9/1990 | Klopfer et al. |
| 4,970,411 A | 11/1990 | Halg et al. |
| 4,983,916 A | 1/1991 | Iijima et al. |
| 5,012,322 A | 4/1991 | Guillotte |
| 5,021,493 A | 6/1991 | Sandstrom |
| 5,028,868 A | 7/1991 | Murata et al. |
| 5,038,130 A | 8/1991 | Eck et al. |
| 5,045,920 A | 9/1991 | Vig et al. |
| 5,078,944 A | 1/1992 | Yoshino |
| 5,084,289 A | 1/1992 | Shin et al. |
| 5,121,289 A | 6/1992 | Gagliardi |
| 5,137,677 A | 8/1992 | Murata |
| 5,139,973 A | 8/1992 | Nagy et al. |
| 5,167,896 A | 12/1992 | Hirota et al. |
| 5,185,919 A | 2/1993 | Hickey |
| 5,196,794 A | 3/1993 | Murata |
| 5,200,698 A | 4/1993 | Thibaud |
| 5,210,493 A | 5/1993 | Schroeder et al. |
| 5,216,405 A | 6/1993 | Schroeder et al. |
| 5,244,834 A | 9/1993 | Suzuki et al. |
| 5,247,202 A | 9/1993 | Popovic et al. |
| 5,247,278 A | 9/1993 | Pant et al. |
| 5,250,925 A | 10/1993 | Shinkle |
| 5,289,344 A | 2/1994 | Gagnon et al. |
| 5,286,426 A | 3/1994 | Rano, Jr. et al. |
| 5,304,926 A * | 4/1994 | Wu ........................ G01D 5/147 324/207.2 |
| 5,315,245 A | 5/1994 | Schroeder et al. |
| 5,329,416 A | 7/1994 | Ushiyama et al. |
| 5,332,956 A | 7/1994 | Oh |
| 5,332,965 A | 7/1994 | Wolf et al. |
| 5,341,097 A | 8/1994 | Wu |
| 5,351,028 A | 9/1994 | Krahn |
| 5,399,968 A | 3/1995 | Sheppard et al. |
| 5,412,255 A | 5/1995 | Wallrafen |
| 5,414,355 A | 5/1995 | Davidson et al. |
| 5,424,558 A | 6/1995 | Borden et al. |
| 5,432,444 A | 7/1995 | Yasohama et al. |
| 5,434,105 A | 7/1995 | Liou |
| 5,453,727 A | 9/1995 | Shibasaki et al. |
| 5,469,058 A | 11/1995 | Dunnam |
| 5,477,143 A | 12/1995 | Wu |
| 5,479,695 A | 1/1996 | Grader et al. |
| 5,486,759 A | 1/1996 | Seiler et al. |
| 5,488,294 A | 1/1996 | Liddell et al. |
| 5,491,633 A | 2/1996 | Henry et al. |
| 5,497,081 A | 3/1996 | Wolf et al. |
| 5,500,589 A | 3/1996 | Sumcad |
| 5,500,994 A | 3/1996 | Itaya |
| 5,508,611 A | 4/1996 | Schroeder et al. |
| 5,521,501 A | 5/1996 | Dettmann et al. |
| 5,545,983 A | 8/1996 | Okeya et al. |
| 5,551,146 A | 9/1996 | Kawabata et al. |
| 5,581,170 A | 12/1996 | MammanO et al. |
| 5,581,179 A | 12/1996 | Engel et al. |
| 5,583,436 A | 12/1996 | Van De Walle et al. |
| 5,596,272 A | 1/1997 | Busch |
| 5,621,319 A | 4/1997 | Bilotti et al. |
| 5,627,315 A | 5/1997 | Figi et al. |
| 5,631,557 A | 5/1997 | Davidson |
| 5,640,090 A | 6/1997 | Furuya et al. |
| 5,691,637 A | 11/1997 | Oswald et al. |
| 5,696,790 A | 12/1997 | Graham et al. |
| 5,712,562 A | 1/1998 | Berg |
| 5,714,102 A | 2/1998 | Highum et al. |
| 5,719,496 A | 2/1998 | Wolf |
| 5,729,128 A | 3/1998 | Bunyer et al. |
| 5,757,181 A | 5/1998 | Wolf et al. |
| 5,781,005 A | 7/1998 | Vig et al. |
| 5,789,658 A | 8/1998 | Henn et al. |
| 5,789,915 A | 8/1998 | Ingraham |
| 5,796,249 A | 8/1998 | Andräet et al. |
| 5,818,222 A | 10/1998 | Ramsden |
| 5,818,223 A | 10/1998 | Wolf |
| 5,839,185 A | 11/1998 | Smith et al. |
| 5,841,276 A | 11/1998 | Makino et al. |
| 5,859,387 A | 1/1999 | Gagnon |
| 5,886,070 A | 2/1999 | Honkura et al. |
| 5,883,567 A | 3/1999 | Mullins, Jr. |
| 5,896,030 A | 4/1999 | Hasken |
| 5,912,556 A | 6/1999 | Frazee et al. |
| 5,963,028 A | 10/1999 | Engel et al. |
| 6,011,770 A | 1/2000 | Tan |
| 6,016,055 A | 1/2000 | Jager et al. |
| 6,043,646 A | 3/2000 | Jansseune |
| 6,064,198 A | 5/2000 | Wolf et al. |
| 6,136,250 A | 10/2000 | Brown |
| 6,175,233 B1 | 1/2001 | McCurley et al. |
| 6,180,041 B1 | 1/2001 | Takizawa |
| 6,184,679 B1 | 2/2001 | Popovic et al. |
| 6,194,893 B1 | 2/2001 | Yokotani et al. |
| 6,198,373 B1 | 3/2001 | Ogawa et al. |
| 6,242,604 B1 | 6/2001 | Hudlicky et al. |
| 6,242,904 B1 | 6/2001 | Shirai et al. |
| 6,242,905 B1 | 6/2001 | Draxelmayr |
| 6,265,865 B1 | 7/2001 | Engel et al. |
| 6,278,269 B1 | 8/2001 | Vig et al. |
| 6,297,627 B1 | 10/2001 | Towne et al. |
| 6,339,322 B1 | 1/2002 | Loreck et al. |
| 6,351,506 B1 | 2/2002 | Lewicki |
| 6,356,068 B1 | 3/2002 | Steiner et al. |
| 6,392,478 B1 | 5/2002 | Mulder et al. |
| 6,429,640 B1 | 8/2002 | Daughton et al. |
| 6,436,748 B1 | 8/2002 | Forbes et al. |
| 6,437,558 B2 | 8/2002 | Li et al. |
| 6,452,381 B1 | 9/2002 | Nakatani et al. |
| 6,462,536 B1 | 10/2002 | Mednikov et al. |
| 6,492,804 B2 | 12/2002 | Tsuge et al. |
| 6,501,270 B1 | 12/2002 | Opie |
| 6,504,363 B1 | 1/2003 | Dogaru et al. |
| 6,525,531 B2 | 2/2003 | Forrest et al. |
| 6,542,847 B1 | 4/2003 | Lohberg et al. |
| 6,545,332 B2 | 4/2003 | Huang |
| 6,545,457 B2 | 4/2003 | Goto et al. |
| 6,545,462 B2 | 4/2003 | Schott et al. |
| 6,566,872 B1 | 5/2003 | Sugitani |
| 6,640,451 B1 | 11/2003 | Vinarcik |
| 6,653,968 B1 | 11/2003 | Schneider |
| 6,687,644 B1 | 2/2004 | Zinke et al. |
| 6,692,676 B1 | 2/2004 | Vig et al. |
| 6,707,298 B2 | 3/2004 | Suzuki et al. |
| 6,759,843 B2 | 7/2004 | Furlong |
| 6,768,301 B1 | 7/2004 | Hohe et al. |
| 6,770,163 B1 | 8/2004 | Kuah et al. |
| 6,781,233 B2 | 8/2004 | Zverev et al. |
| 6,781,359 B2 | 8/2004 | Stauth et al. |
| 6,798,193 B2 | 9/2004 | Zimmerman et al. |
| 6,815,944 B2 | 11/2004 | Vig et al. |

(56) References Cited

U.S. PATENT DOCUMENTS

| | | |
|---|---|---|
| 6,822,443 B1 | 11/2004 | Dogaru |
| 6,853,178 B2 | 2/2005 | Hayat-Dawoodi |
| 6,896,407 B2 | 5/2005 | Nomiyama et al. |
| 6,902,951 B2 | 6/2005 | Goller et al. |
| 6,917,321 B1 | 7/2005 | Haurie et al. |
| 6,956,366 B2 | 10/2005 | Butzmann |
| 7,026,808 B2 | 4/2006 | Vig et al. |
| 7,031,170 B2 | 4/2006 | Daeche et al. |
| 7,038,448 B2 | 5/2006 | Schott et al. |
| 7,049,924 B2 | 5/2006 | Hayashi et al. |
| 7,112,955 B2 | 9/2006 | Buchhold |
| 7,112,957 B2 | 9/2006 | Bicking |
| 7,126,327 B1 | 10/2006 | Busch |
| 7,132,825 B2 | 11/2006 | Martin |
| 7,190,784 B2 | 3/2007 | Li |
| 7,193,412 B2 | 3/2007 | Freeman |
| 7,199,579 B2 | 4/2007 | Scheller et al. |
| 7,253,614 B2 | 8/2007 | Forrest et al. |
| 7,259,545 B2 | 8/2007 | Stauth et al. |
| 7,265,531 B2 | 9/2007 | Stauth et al. |
| 7,269,992 B2 | 9/2007 | Lamb et al. |
| 7,285,952 B1 | 10/2007 | Hatanaka et al. |
| 7,292,095 B2 | 11/2007 | Burt et al. |
| 7,295,000 B2 | 11/2007 | Werth |
| 7,319,319 B2 | 1/2008 | Jones et al. |
| 7,323,780 B2 | 1/2008 | Daubenspeck et al. |
| 7,323,870 B2 | 1/2008 | Tatschl et al. |
| 7,325,175 B2 | 1/2008 | Momtaz |
| 7,345,468 B2 | 3/2008 | Okada et al. |
| 7,355,388 B2 | 4/2008 | Ishio |
| 7,361,531 B2 | 4/2008 | Sharma et al. |
| 7,362,094 B2 | 4/2008 | Voisine et al. |
| 7,365,530 B2 | 4/2008 | Bailey et al. |
| 7,368,904 B2 | 5/2008 | Scheller et al. |
| 7,385,394 B2 | 6/2008 | Auburger et al. |
| 7,425,821 B2 | 9/2008 | Monreal et al. |
| 7,474,093 B2 | 1/2009 | Ausserlechner |
| 7,476,953 B2 | 1/2009 | Taylor et al. |
| 7,518,354 B2 | 4/2009 | Stauth et al. |
| 7,592,801 B2 | 9/2009 | Bailey et al. |
| 7,598,601 B2 | 10/2009 | Taylor et al. |
| 7,605,647 B1 | 10/2009 | Romero et al. |
| 7,635,993 B2 | 12/2009 | Boeve |
| 7,694,200 B2 | 4/2010 | Forrest et al. |
| 7,701,208 B2 | 4/2010 | Nishikawa |
| 7,729,675 B2 | 6/2010 | Krone |
| 7,746,056 B2 | 6/2010 | Stauth et al. |
| 7,746,065 B2 | 6/2010 | Pastre et al. |
| 7,764,118 B2 | 7/2010 | Kusuda et al. |
| 7,768,083 B2 | 8/2010 | Doogue et al. |
| 7,769,110 B2 | 8/2010 | Momtaz |
| 7,772,838 B2 | 8/2010 | Bailey et al. |
| 7,800,389 B2 | 9/2010 | Friedrich et al. |
| 7,808,074 B2 | 10/2010 | Knittl |
| 7,816,772 B2 | 10/2010 | Engel et al. |
| 7,816,905 B2 | 10/2010 | Doogue et al. |
| 7,839,141 B2 | 11/2010 | Werth et al. |
| 7,915,886 B2 | 3/2011 | Stolfus et al. |
| 7,923,996 B2 | 4/2011 | Doogue et al. |
| 7,936,144 B2 | 5/2011 | Vig et al. |
| 7,956,604 B2 | 6/2011 | Ausserlechner |
| 7,961,823 B2 | 6/2011 | Kolze et al. |
| 7,990,209 B2 | 8/2011 | Romero |
| 8,030,918 B2 | 10/2011 | Doogue et al. |
| 8,058,870 B2 | 11/2011 | Sterling |
| 8,063,631 B2 | 11/2011 | Fermon et al. |
| 8,063,634 B2 | 11/2011 | Sauber et al. |
| 8,080,993 B2 | 12/2011 | Theuss et al. |
| 8,106,654 B2 | 1/2012 | Theuss et al. |
| 8,128,549 B2 | 3/2012 | Testani et al. |
| 8,134,358 B2 | 3/2012 | Charlier et al. |
| 8,143,169 B2 | 3/2012 | Engel et al. |
| 8,253,210 B2 | 8/2012 | Theuss et al. |
| 8,274,279 B2 | 9/2012 | Gies |
| 8,362,579 B2 | 1/2013 | Theuss et al. |
| 8,610,430 B2 | 12/2013 | Werth et al. |
| 8,729,890 B2 | 5/2014 | Donovan et al. |
| 8,773,124 B2 | 7/2014 | Ausserlechner |
| 9,116,018 B2 | 8/2015 | Frachon |
| 9,164,156 B2 | 10/2015 | Elian et al. |
| 9,201,123 B2 | 12/2015 | Elian et al. |
| 2001/0002791 A1 | 6/2001 | Tsuge et al. |
| 2001/0009367 A1 | 7/2001 | Seitzer et al. |
| 2002/0027488 A1 | 3/2002 | Hayat-Dawoodi et al. |
| 2002/0084923 A1 | 7/2002 | Li |
| 2002/0097639 A1 | 7/2002 | Ishizaki et al. |
| 2003/0001563 A1 | 1/2003 | Turner |
| 2003/0038675 A1 | 2/2003 | Gailus et al. |
| 2003/0062891 A1 | 4/2003 | Slates |
| 2003/0102909 A1 | 6/2003 | Motz |
| 2003/0107366 A1 | 6/2003 | Busch et al. |
| 2003/0151406 A1 | 8/2003 | Wan et al. |
| 2003/0222642 A1 | 12/2003 | Butzmann |
| 2004/0032251 A1 | 2/2004 | Zimmerman et al. |
| 2004/0046248 A1 | 3/2004 | Waelti et al. |
| 2004/0062362 A1 | 4/2004 | Matsuya |
| 2004/0080314 A1 | 4/2004 | Tsujii et al. |
| 2004/0135220 A1 | 7/2004 | Goto |
| 2004/0056647 A1 | 8/2004 | Stauth et al. |
| 2004/0184196 A1 | 9/2004 | Jayasekara |
| 2004/0196045 A1 | 10/2004 | Larsen |
| 2005/0120782 A1 | 6/2005 | Kishibata et al. |
| 2005/0122099 A1 | 6/2005 | Imamoto et al. |
| 2005/0167790 A1 | 8/2005 | Khor et al. |
| 2005/0179429 A1 | 8/2005 | Lohberg |
| 2005/0225318 A1 | 10/2005 | Bailey et al. |
| 2005/0258820 A1 | 11/2005 | Forster |
| 2005/0280411 A1 | 12/2005 | Bicking |
| 2006/0033487 A1 | 2/2006 | Nagano et al. |
| 2006/0038559 A1 | 2/2006 | Lamb et al. |
| 2006/0038561 A1 | 2/2006 | Honkura et al. |
| 2006/0068237 A1 | 3/2006 | Murphy |
| 2006/0125473 A1 | 6/2006 | Frachon et al. |
| 2006/0175674 A1 | 8/2006 | Taylor |
| 2006/0181263 A1 | 8/2006 | Doogue et al. |
| 2006/0202692 A1 | 9/2006 | Tatschl et al. |
| 2006/0261801 A1 | 11/2006 | Busch |
| 2007/0110199 A1 | 5/2007 | Momtaz et al. |
| 2007/0170533 A1 | 7/2007 | Doogue et al. |
| 2007/0247141 A1 | 10/2007 | Pastre et al. |
| 2007/0285089 A1 | 12/2007 | Ibuki et al. |
| 2008/0013298 A1 | 1/2008 | Sharma et al. |
| 2008/0094055 A1 | 4/2008 | Monreal et al. |
| 2008/0116884 A1* | 5/2008 | Rettig .......... G01D 5/147 324/207.21 |
| 2008/0116885 A1 | 5/2008 | Van Zon et al. |
| 2008/0137784 A1 | 6/2008 | Krone |
| 2008/0143329 A1 | 6/2008 | Ishihara |
| 2008/0204011 A1 | 8/2008 | Shoji |
| 2008/0237818 A1 | 10/2008 | Engel et al. |
| 2008/0238410 A1 | 10/2008 | Charlier et al. |
| 2008/0270067 A1 | 10/2008 | Eriksen et al. |
| 2009/0001964 A1 | 1/2009 | Strzalkowski |
| 2009/0001972 A1 | 1/2009 | Fernandez et al. |
| 2009/0009163 A1 | 1/2009 | Yamada |
| 2009/0058404 A1 | 3/2009 | Kurumado |
| 2009/0085706 A1 | 4/2009 | Baarman et al. |
| 2009/0102467 A1 | 4/2009 | Snell et al. |
| 2009/0115412 A1 | 5/2009 | Fuse |
| 2009/0137398 A1 | 5/2009 | Bozovic et al. |
| 2009/0140725 A1 | 6/2009 | Ausserlechner |
| 2009/0146647 A1 | 6/2009 | Ausserlechner |
| 2009/0152696 A1 | 6/2009 | Dimasacat et al. |
| 2009/0167298 A1 | 7/2009 | Kreutzbruck et al. |
| 2009/0168286 A1 | 7/2009 | Berkley et al. |
| 2009/0206831 A1 | 8/2009 | Fermon et al. |
| 2009/0212765 A1 | 8/2009 | Doogue et al. |
| 2009/0212771 A1 | 8/2009 | Cummings et al. |
| 2009/0243601 A1 | 10/2009 | Feldtkeller |
| 2009/0251134 A1 | 10/2009 | Uenoyama |
| 2009/0256552 A1 | 10/2009 | Guo et al. |
| 2010/0026279 A1 | 2/2010 | Vig et al. |
| 2010/0026288 A1 | 2/2010 | Sauber et al. |
| 2010/0033175 A1 | 2/2010 | Boeve et al. |

(56) References Cited

U.S. PATENT DOCUMENTS

| | | | |
|---|---|---|---|
| 2010/0052667 A1 | 3/2010 | Kohama et al. | |
| 2010/0141249 A1 | 6/2010 | Ararao et al. | |
| 2010/0188078 A1 | 7/2010 | Foletto et al. | |
| 2010/0201356 A1 | 8/2010 | Koller et al. | |
| 2010/0211347 A1 | 8/2010 | Friedrich et al. | |
| 2010/0237450 A1 | 9/2010 | Doogue et al. | |
| 2010/0276769 A1 | 11/2010 | Theuss et al. | |
| 2010/0295140 A1 | 11/2010 | Theuss et al. | |
| 2010/0330708 A1 | 12/2010 | Engel et al. | |
| 2011/0018533 A1 | 1/2011 | Cesaretti et al. | |
| 2011/0031960 A1 | 2/2011 | Hohe et al. | |
| 2011/0048102 A1 | 3/2011 | Fernandez et al. | |
| 2011/0074405 A1 | 3/2011 | Doogue et al. | |
| 2011/0127998 A1 | 6/2011 | Elian et al. | |
| 2011/0267040 A1 | 11/2011 | Frachon | |
| 2011/0285384 A1 | 11/2011 | Nomura | |
| 2011/0298448 A1 | 12/2011 | Foletto et al. | |
| 2012/0013333 A1 | 1/2012 | Ararao et al. | |
| 2012/0019236 A1 | 1/2012 | Tiernan et al. | |
| 2012/0062215 A1 | 3/2012 | Ide et al. | |
| 2012/0086090 A1 | 4/2012 | Sharma et al. | |
| 2012/0249133 A1 | 10/2012 | Friedrich | |
| 2012/0274314 A1 | 11/2012 | Cesaretti et al. | |
| 2013/0138372 A1 | 5/2013 | Ausserlechner | |
| 2013/0214774 A1 | 8/2013 | Cesaretti et al. | |
| 2013/0214777 A1 | 8/2013 | Itoi | |
| 2013/0241543 A1 | 9/2013 | Stenson et al. | |
| 2013/0249029 A1 | 9/2013 | Vig et al. | |
| 2013/0278246 A1 | 10/2013 | Stegerer et al. | |
| 2013/0300401 A1 | 11/2013 | Krapf et al. | |
| 2013/0300406 A1 | 11/2013 | Pepka et al. | |
| 2014/0266181 A1 | 9/2014 | Milano et al. | |
| 2014/0327435 A1 | 11/2014 | Rohrer | |
| 2014/0333295 A1 | 11/2014 | Fernandez et al. | |
| 2014/0347044 A1 | 11/2014 | Monreal et al. | |
| 2015/0022186 A1 | 1/2015 | Ausserlechner | |
| 2015/0022187 A1 | 1/2015 | Taylor et al. | |
| 2015/0022193 A1 | 1/2015 | Burdette et al. | |
| 2015/0022197 A1 | 1/2015 | David et al. | |
| 2015/0022198 A1 | 1/2015 | David et al. | |
| 2015/0346289 A1* | 12/2015 | Ausserlechner | G01R 33/07 324/251 |
| 2015/0354985 A1 | 12/2015 | Judkins, III et al. | |
| 2015/0377648 A1 | 12/2015 | Sirohiwala et al. | |
| 2016/0011281 A1* | 1/2016 | Sander | G01R 33/077 324/207.2 |
| 2016/0123771 A1 | 5/2016 | David et al. | |
| 2016/0123774 A1* | 5/2016 | Foletto | G01D 5/145 324/207.21 |

FOREIGN PATENT DOCUMENTS

| | | |
|---|---|---|
| CN | 102713654 A | 10/2012 |
| CN | 102954808 A | 3/2013 |
| DE | 25 18 054 | 11/1976 |
| DE | 40 31 560 | 4/1992 |
| DE | 195 39 458 A1 | 4/1997 |
| DE | 196 34 715 A1 | 3/1998 |
| DE | 196 50 935 A1 | 6/1998 |
| DE | 198 38 433 | 3/1999 |
| DE | 199 61 504 A1 | 6/2001 |
| DE | 102 10 184 | 9/2003 |
| DE | 103 14 602 A1 | 10/2004 |
| DE | 10 2004 017 191 A1 | 10/2005 |
| DE | 10 2006 037 226 A1 | 2/2008 |
| DE | 10 2007 018 238 A1 | 10/2008 |
| DE | 10 2007 041 230 B3 | 4/2009 |
| DE | 10 2010 016 584 A1 | 11/2010 |
| DE | 10 2011 102483 | 11/2012 |
| EP | 0 289 414 A2 | 11/1988 |
| EP | 0 289 414 A3 | 11/1988 |
| EP | 0 357 013 A2 | 3/1990 |
| EP | 0 357 013 A3 | 3/1990 |
| EP | 0 361 456 A2 | 4/1990 |
| EP | 0 361 456 A3 | 4/1990 |
| EP | 0 680 103 A1 | 11/1995 |
| EP | 0 898 180 A2 | 2/1999 |
| EP | 0 944 888 B1 | 10/2001 |
| EP | 1306687 A2 | 5/2003 |
| EP | 1 443 332 A1 | 8/2004 |
| EP | 1 580 560 A1 | 9/2005 |
| EP | 1 637 898 A1 | 3/2006 |
| EP | 1 662 353 A1 | 5/2006 |
| EP | 1 679 524 A1 | 7/2006 |
| EP | 1 850 143 A1 | 10/2007 |
| EP | 2 063 229 | 5/2009 |
| EP | 2 063 229 A1 | 5/2009 |
| FR | 2 748 105 | 10/1997 |
| FR | 2 909 756 | 6/2008 |
| GB | 2276727 A | 10/1994 |
| GB | 2481482 | 12/2011 |
| JP | 60-152950 | 8/1985 |
| JP | 61-48777 | 3/1986 |
| JP | S61-48777 | 3/1986 |
| JP | S6367583 A | 3/1988 |
| JP | 363 084176 A | 4/1988 |
| JP | 63 -263782 | 10/1988 |
| JP | 63-300911 | 12/1988 |
| JP | H02-116753 | 5/1990 |
| JP | 02-149013 | 6/1990 |
| JP | H03-29817 | 2/1991 |
| JP | H04-095817 | 3/1992 |
| JP | 04-152688 | 5/1992 |
| JP | H06-273437 | 9/1994 |
| JP | 08-97486 | 4/1996 |
| JP | H08-511348 A | 11/1996 |
| JP | 09-166612 | 6/1997 |
| JP | 10-332725 | 12/1998 |
| JP | 11-064363 | 3/1999 |
| JP | 11-74142 | 3/1999 |
| JP | 2000-183241 A | 6/2000 |
| JP | 2001-043475 | 2/2001 |
| JP | 2001-141738 A | 5/2001 |
| JP | 2001-165702 | 6/2001 |
| JP | 2001-1659951 | 6/2001 |
| JP | 2002-117500 | 4/2002 |
| JP | 2002-149013 | 5/2002 |
| JP | 2002-357920 | 12/2002 |
| JP | 2003-177171 | 6/2003 |
| JP | 2003-202365 A | 7/2003 |
| JP | 2004-055932 | 2/2004 |
| JP | 2004-093381 | 3/2004 |
| JP | 2004-152688 | 5/2004 |
| JP | 2004-356338 | 12/2004 |
| JP | 2004-357858 | 12/2004 |
| JP | 2005-517928 | 6/2005 |
| JP | 2005-337866 | 12/2005 |
| JP | 2005-345302 | 12/2005 |
| JP | 2006-003096 | 1/2006 |
| JP | 2006-3116 A | 1/2006 |
| JP | 2006-275764 | 10/2006 |
| JP | 2007-012582 A | 1/2007 |
| JP | 2007-218799 | 8/2007 |
| JP | 2008-180550 | 8/2008 |
| JP | 2008-264569 | 11/2008 |
| JP | 2008-286667 A | 11/2008 |
| JP | 2009-002911 A | 1/2009 |
| JP | 2009-222524 | 10/2009 |
| JP | 2009-250725 A | 10/2009 |
| JP | 2009-250931 A | 10/2009 |
| JP | 2010-537207 A | 12/2010 |
| JP | 2011/086479 | 4/2011 |
| JP | 4880874 | 12/2011 |
| JP | 2012-501446 A | 1/2012 |
| KR | 2012-0040247 A | 4/2012 |
| WO | WO 88/09026 | 11/1988 |
| WO | WO 93/12403 | 6/1993 |
| WO | WO 94/08203 | 4/1994 |
| WO | WO 94/29672 A1 | 12/1994 |
| WO | WO 95/18982 | 7/1995 |
| WO | WO 96 02849 A1 | 2/1996 |
| WO | WO 96/02849 A1 | 2/1996 |
| WO | WO 99/49322 | 9/1999 |

(56) References Cited

FOREIGN PATENT DOCUMENTS

| WO | WO 2001/74139 A2 | 10/2001 |
|---|---|---|
| WO | WO 2001/74139 A3 | 10/2001 |
| WO | WO 2003/069358 A2 | 8/2003 |
| WO | WO 2003/069358 A3 | 8/2003 |
| WO | WO 2003/107018 A1 | 12/2003 |
| WO | WO 2004/027436 | 4/2004 |
| WO | WO 2004/072672 A1 | 8/2004 |
| WO | WO 2005/013363 A2 | 2/2005 |
| WO | WO 2005/013363 A3 | 2/2005 |
| WO | WO 2006/056829 | 6/2006 |
| WO | WO 2006/083479 | 8/2006 |
| WO | WO2007/095971 A1 | 8/2007 |
| WO | WO 2007/138508 A1 | 12/2007 |
| WO | WO 2008/008140 A2 | 1/2008 |
| WO | WO 2008/008140 A3 | 1/2008 |
| WO | WO 2008/048379 A1 | 4/2008 |
| WO | WO 2008/121443 A1 | 10/2008 |
| WO | WO 2008/145662 A1 | 12/2008 |
| WO | WO 2009/108422 A2 | 9/2009 |
| WO | WO 2009/108422 A3 | 9/2009 |
| WO | WO 2010/014309 A1 | 2/2010 |
| WO | WO 2010/027658 A2 | 3/2010 |
| WO | WO 2010/065315 | 6/2010 |
| WO | WO 2010/096367 A1 | 8/2010 |
| WO | WO 2011/011479 | 1/2011 |
| WO | WO 2012/148646 | 11/2012 |
| WO | WO 2013/169455 | 11/2013 |
| WO | WO2015/058733 A1 | 4/2015 |

OTHER PUBLICATIONS

European Response filed on Aug. 24, 2016 to the official communication dated Feb. 23, 2016; for European Pat. App. No. 14742423.8; 17 pages.
Voluntary Amendment dated Nov. 2, 2016 with English claims for Chinese Application No. 201480040243.6; 13 pages.
European Extended Search Report dated Dec. 22, 2016; for European Pat. App. No. 16193227.2; 11 pages.
Japanese Voluntary Amendment with English Claims dated Dec. 12, 2016; for Japanese Pat. App. No. 2016-528006; 7 pages.
Response filed on Jan. 19, 2017 to Final Office Action dated Oct. 20, 2016; for U.S. Appl. No. 13/946,400;; 13 Pages.
Japanese Office Action (with English Translation) dated Jan. 13, 2017 for Japanese Application No. 2015-511491; 11 Pages.
U.S. Final Office Action dated Feb. 10, 2017 for U.S. Appl. No. 13/468,478; 27 Pages.
U.S. Advisory Action dated Feb. 16, 2017 for U.S. Appl. No. 13/946,400; 4 Pages.
Response to U.S. Final Office Action dated Oct. 20, 2016 (w/RCE) for U.S. Appl. No. 13/946,400; Response filed on Feb. 23, 2017; 17 Pages.
Applicant-Initiated Interview Summary dated Mar. 10, 2017 for U.S. Appl. No. 13/946,400; 2 pages.
U.S. Non-Final Office Action dated Apr. 6, 2017 for U.S. Appl. No. 13/946,400; 36 Pages.
Response (with Amended Claims in English) to Japanese Office Action dated Feb. 13, 2017 for Japanese Application No. 2015-511491; Response filed on Apr. 11, 2017; 9 Pages.
Response to U.S. Final Office Action dated Feb. 10, 2017 for U.S. Appl. No. 13/468,478; Response filed on May 3, 2017; 9 Pages.
Notice of Allowance dated May 15, 2017 for U.S. Appl. No. 13/468,478; 15 Pages.
Request for Continued Examination for U.S. Appl. No. 13/468,478, filed Jun. 5, 2017; 3 Pages.
Japanese Office Action (with English Translation) dated May 18, 2017 for Japanese Application No. 2015-511491; 8 Pages.
Response to Office Action filed on Jun. 30, 2017 for U.S. Appl. No. 13/946,400; 12 Pages.
Japanese Office Action (with English Translation) dated May 18, 2017 for Japanese Application No. 2015-511491; 5 Pages.

PCT International Search Report and Written Opinion dated Jul. 20, 2017 for PCT Appl. No. PCT/US2017/033530; 15 pages.
PCT International Search Report and Written Opinion dated Jul. 20, 2017 for PCT/US2017/033526; 17 pages.
Japanese Office Action with English translation dated May 18, 2017 for Japanese Application No. 2015-511491, 5 pages.
Final Office Action dated Oct. 20, 2016 for U.S. Appl. No. 13/946,400; 20 pages.
Korean Office Action (with English Translation) dated Dec. 20, 2017 corresponding to Korean Appl. No. 10-2014-7032857; 14 Pages.
U.S. Non-Final Office Action dated Jan. 9, 2018 corresponding to U.S. Appl. No. 15/709,739; 12 Pages.
U.S. Appl. No. 15/709,739, filed Sep. 20, 2017, Pepka et al.
Response to Official Communication dated Mar. 13, 2017 for European Application No. 16193227.2; Response filed Oct. 2, 2017; 7 pages.
U.S. Final Office Action dated Oct. 5, 2017 for U.S. Appl. No. 13/946,400; 39 pages.
Response to U.S. Final Office Action dated Oct. 5, 2017 for U.S. Appl. No. 13/946,400; Response filed on Feb. 27, 2018; 14 Pages.
Japanese Petition (with Machine English Translation) filed Jan. 24, 2018 for Japanese Application No. 2015-511491; 10 Pages.
Response (with English Translation) to Korean Notice of Reasons for Refusal dated Dec. 20, 2017 for Korean Application No. 10-2014-7032857; Response filed Feb. 14, 2018; 47 Pages.
Chinese Office Action (w/English Translation) dated Feb. 1, 2018 for Chinese Application No. 201480040243.6; 26 Pages.
Ahn et al., "A New Toroidal-Meander Type Integrated Inductor With a Multilevel Meander Magnetic Core", IEEE Transactions on Magnetics, vol. 30, No. 1, Jan. 1994, pp. 73-79.
Allegro "Two-Wire True Zero Speed Miniature Differential Peak-Detecting Gear Tooth Sensor;" ATS645LSH; 2004; Allegro MicroSystems, Inc., Worcester, MA 01615; pp. 1-14.
Allegro Microsystems, Inc. Data Sheet A1341; "High Precision, Highly Programmable Linear Hall Effect Sensor IC with EEPROM, Output Protocols SENT and PWM, and Advanced Output Linearization Capabilities;" May 17, 2010; 46 pages.
Allegro Microsystems, Inc. Data Sheet ATS601LSG; "Non-TPOS, Tooth Detecting Speed Sensor;" Nov. 1, 2011; 9 pages.
Allegro Microsystems, Inc., "Gear-Tooth Sensor for Automotive Applications," Aug. 3, 2001.
Allegro MicroSystems, Inc., Hall-Effect IC Applications Guide, http://www.allegromicro.com/en/Products/Design/an/an27701.pdf, Copyright 1987, 1997, pp. 1-36.
Alllegro "True Zero-Speed Low-Jitter High Accuracy Gear Tooth Sensor;" ATS625LSG; 2005; Allegro MicroSystems, Inc. Worcester, MA 01615; pp. 1-21.
Ausserlechner et al.; "Compensation of the Piezo-Hall Effect in Integrated Hall Sensors on (100)-Si;" IEEE Sensors Journal, vol. 7, No. 11; Nov. 2007; ISBN: 1530-437X; pp. 1475-1482.
Ausserlechner et al.; "Drift of Magnetic Sensitivity of Small Hall Sensors Due to Moisture Absorbed by the IC-Package;" Proceedings of IEEE Sensors, 2004; vol. 1; Oct. 24, 2004; ISBN:0-7803-8692-2; pp. 455-458.
Ausserlechner; "Limits of Offset Cancellation by the Principle of Spinning Current Hall Probe;" Proceedings of IEEE Sensors; Oct. 2004; pp. 1117-1120.
Ausserlechner; "The piezo-Hall effect in n-silicon for arbitrary crystal orientation;" Proceedings of IEEE Sensors; vol. 3; Oct. 24, 2004; ISBN: 0-7803-8692-2; pp. 1149-1152.
Bahreyni, et al.; "A Resonant Micromachined Magnetic Field Sensor;" IEEE Sensors Journal; vol. 7, No. 9, Sep. 2007; pp. 1326-1334.
Barrettino, et al.; "CMOS-Based Monolithic Controllers for Smart Sensors Comprising Micromembranes and Microcantilevers;" IEEE Transactions on Circuits and Systems-I Regular Papers vol. 54, No. 1; Jan. 2007; pp. 141-152.
Baschirotto et al.; "Development and Analysis of PCB Vector 2-D Magnetic Field Sensor System for Electronic Compass;" IEEE Sensors Journal vol. 6, No. 2; Apr. 2006; pp. 365-371.

(56) References Cited

OTHER PUBLICATIONS

Bilotti et al.; "Monolithic Magnetic Hall Sensor Using Dynamic Quadrature Offset Cancellation;" IEEE Journal of Solid-State Circuits; vol. 32, Issue 6; Jun. 1997; pp. 829-836.
Bowers et al., "Microfabrication and Process Integration of Powder-Based Permanent Magnets", Interdisciplinary Microsystems Group, Dept. Electrical and Computer Engineering, University of Florida, USA; Technologies for Future Micro-Nano Manufacturing Workshop, Napa, California, Aug. 8-10, 2011, pp. 162-165.
Demierre, et al.; "Reference Magnetic Actuator for Self-Calibration of a Very Small Hall Sensor Array;" Sensors and Actuators A97-98; Apr. 2002; pp. 39-46.
Dwyer, "Back-Biased Packaging Advances (SE, SG & SH versus SA & SB)," http://www.allegromicro.com/en/Products/Design/packaging_advances/index.asp, Copyright 2008, pp. 1-5.
Frick, et al.; "CMOS Microsystem for AC Current Measurement with Galvanic Isolation;" IEEE Sensors Journal; vol. 3, No. 6; Dec. 2003; pp. 752-760.
Halg; "Piezo-Hall Coefficients of n-Type Silicon;" Journal of Applied Physics; vol. 64, No. 1; Jul. 1, 1988; pp. 276-282.
Honeywell International, Inc., "Hall Effect Sensing and Application," Micro Switch Sensing and Control, Chapter 3, http://content.honeywell.com/sensing/prodinfo/solidstate/technical/hallbook.pdf, date unavailable but believed to be before Jan. 2008, pp. 9-18.
Hosticka; "CMOS Sensor Systems;" Sensors and Actuators A66; Apr. 1998; pp. 335-341.
Infineon Product Brief, TLE 4941plusC, Differential Hall IC for Wheel Speed Sensing, Oct. 2010, www.infineon.com/sensors, 2 pages.
Infineon Technologies; "Differential Two-Wire Hall Effect Sensor IC;" TLE4942 Preliminary Data Sheet; Jun. 2000; pp. 1-13.
Johnson et al., "Hybrid Hall Effect Device," Appl. Phys. Lett., vol. 71, No. 7, Aug. 1997, pp. 974-976.
Kanda et al.; "The Piezo-Hall Effect in n-Silicon;" $22^{nd}$ International Conference on the Physics of Semiconductors; vol. 1, Jan. 1995; pp. 89-92.
Krammerer et al.: "A Hall effect sensors network insensitive to mechanical stress;" Proceedings of IEEE Sensors; vol. 3, Oct. 2004; pp. 1071-1074.
Lagorce et al.; "Magnetic and Mechanical Properties of Micromachined Strontium Ferrite/Polyimide Composites;" Journal of Microelectromechanical Systems; vol. 6, No. 4; Dec. 1997; pp. 307-312.
Lequesne et al.; "High-Accuracy Magnetic Position Encoder Concept;" IEEE Transactions on Industry Applications; vol. 35, No. 3; May/Jun. 1999; pp. 568-576.
Magnani et al.; "Mechanical Stress Measurement Electronics Based on Piezo-Resistive and Piezo-Hall Effects;" $9^{th}$ International Conference on Electronics, Circuits and Systems 2002; vol. 1; SBN: 0-7803-7596-3; Dec. 2002; pp. 363-366.
Manic et al.; "Short and Long-Term Stability Problems of Hall Plates in Plastic Packages;" IEEE $38^{th}$ Annual International Reliability Physics Symposium; Apr. 2000; pp. 225-230.
Manic; "Drift in Silicon Integrated Sensors and Circuits Due to the Thermo-Mechanical Stresses;" Lausanne, École Polytechnique Fédérale De Lausanne 2000; Part 1 of 2; 74 pages.
Manic; "Drift in Silicon Integrated Sensors and Circuits Due to the Thermo-Mechanical Stresses;" Lausanne, École Polytechnique Fédérale De Lausanne 2000; Part 2 of 2; 102 pages.
Melexis Microelectronic Systems, Hall Applications Guide, Section 3—Applications,1997 (48 pages).
Motz et al.; "An Integrated Magnetic Sensor with Two Continuous-Time ΔΣ-Converters and Stress Compensation Capability;" IEEE International Solid-State Circuits Conference; Digest of Technical Papers; Feb. 6, 2006; ISBN: 1-4244-0079-1; pp. 1151-1160.
Motz, et al.; "A Chopped Hall Sensor with Small Jitter and Programmable "True Power-On" Function;" IEEE Journal of Solid-State Circuits; vol. 40, No. 7; Jul. 2005; pp. 1533-1540.
Motz, et al.; "An Integrated Hall Sensor Platform Design for Position, Angle and Current Sensing;" IEEE Sensors 2006; Exco, Daegu, Korea / Oct. 22-25, 2006; pp. 1008-1011.
Munter; "A Low-offset Spinning-current Hall Plate;" Sensors and Actuators A21-A23; 1990; pp. 742-746.
Munter; "Electronic Circuitry for a Smart Spinning-current Hall Plate with Low Offset;" Sensors and Actuators A; Jun. 1991;.pp. 747-751.
Oniku et al., "High-Energy-Density Permanent Micromagnets Formed From Heterogeneous Magnetic Powder Mixtures", Interdisciplinary Microsystems Group, Dept. of Electrical and Computer Engineering, University of Florida, Gainesville, FL 32611, USA; Preprint of MEMS 2012 Conf. Paper, 4 pages.
Park et al.: "Batch-Fabricated Microinductors with Electroplated Magnetically Anisotropic and Laminated Alloy Cores", IEEE Transactions on Magnetics, vol. 35, No. 5, Sep. 1999, 10 pages.
Park et al.; "Ferrite-Based Integrated Planar Inductors and Transformers Fabricated at Low Temperature;" IEEE Transactions on Magnetics; vol. 33, No. 5; Sep. 1997; pp. 3322-3324.
Partin et al.; "Temperature Stable Hall Effect Sensors;" IEEE Sensors Journal, vol. 6, No. 1; Feb. 2006; pp. 106-110.
Pastre, et al.; "A Hall Sensor Analog Front End for Current Measurement with Continuous Gain Calibration;" IEEE Sensors Journal; vol. 7, No. 5; May 2007; pp. 860-867.
Pastre, et al.; "A Hall Sensor-Based Current Measurement Microsystem With Continuous Gain Calibration;" Research in Microelectronics and Electronics, IEEE vol. 2; Jul. 25, 2005; ISBN: 0-7803-9345-7; pp. 95-98.
Popovic; "Sensor Microsystems;" Proc. $20^{th}$ International Conference on Microelectronics (MWIL 95); vol. 2, NIS, Serbia, Sep. 12-14, 1995; pp. 531-537.
Randhawa; "Monolithic Integrated Hall Devices in Silicon Circuits;" Microelectronics Journal; vol. 12, No. 6; Sep. 14-17, 1981; pp. 24-29.
Robert Bosch GMBH Stuttgart; "Active Sensor for ABS/ASR/VDC-Systems with 2-Wire-Current Interface;" Specification TLE4941/TLE4942; Version 5; Jun. 25, 2000; 44 pages.
Ruther et al.; "Integrated CMOS-Based Sensor Array for Mechanical Stress Mapping;" $5^{th}$ IEEE Conference on Sensors, Oct. 2007; pp. 1131-1134.
Ruther et al.; "Thermomagnetic Residual Offset in Integrated Hall Plates;" IEEE Sensors Journal; vol. 3, No. 6; Dec. 2003; pp. 693-699.
Sargent; "Switched-capacitor IC controls feedback loop;" EDN; Design Ideas; Feb. 17, 2000; pp. 154 and 156.
Schneider; "Temperature Calibration of CMOS Magnetic Vector Probe for Contactless Angle Measurement System," IEDM 1996 pp. 533-536.
Schott et al.; "Linearizing Integrated Hall Devices;" 1997 International Conference on Solid-State Sensors and Actuators, Jun. 16-19, 1997; pp. 393-396.
Schott, et al.; "CMOS Single-Chip Electronic Compass with Microcontroller;" IEEE Journal of Solid-State Circuits; vol. 42, No. 12; Dec. 2007; pp. 2923-2933.
Simon et al.; "Autocalibration of Silicon Hall Devices;" $8^{th}$ International Conference on Solid-State Sensors and Actuators; vol. 2; Jun. 25, 1995; pp. 237-240.
Smith et al.; "Low Magnetic Field Sensing with GMR Sensors;" Sensor Magazine; Part 1; Sep. 1999; http://archives.sensormag.com/articles/0999/76mail.shtm; pp. 1-8.
Smith et al.; "Low Magnetic Field Sensing with GMR Sensors;" Sensor Magazine; Part 2; Oct. 1999; http://archives.sensormag.com/articles/1099/84/mail.shtml; pp. 1-11.
Steiner et al.; "Double-Hall Sensor with Self-Compensated Offset;" International Electron Devices Meeting; Dec. 7, 1997; ISBN: 0-7803-4100-7; pp. 911-914.
Steiner et al; Offset Reduction in Hall Devices by Continuous Spinning Current Method; Sensors and Actuators A66; 1998; pp. 167-172.
Stellrecht et al.; Characterization of Hygroscopic Swelling Behavior of Mold Compounds and Plastic Packages; IEEE Transactions on Components and Packaging Technologies; vol. 27, No. 3; Sep. 2004; pp. 499-506.

(56) References Cited

OTHER PUBLICATIONS

Tian et al.; "Multiple Sensors on Pulsed Eddy-Current Detection for 3-D Subsurface Crack Assessment;" IEEE Sensors Journal, vol. 5, No. 1; Feb. 2005; pp. 90-96.
Trontelj et al; "CMOS Integrated Magnetic Field Source Used as a Reference in Magnetic Field Sensors on Common Substrate;" WEP 1-6; IMTC; May 1994; pp. 461-463.
Wu, et al.; "A Chopper Current-Feedback Instrumentation Amplifier with a 1mHz 1/f Noise Corner and an AC-Coupled Ripple-Reduction Loop;" IEEE International Solid-State Circuits Conference; Feb. 10, 2009; pp. 322-324.
Zou et al.; "Three-Dimensional Die Surface Stress Measurements in Delaminated and Non-Delaminated Plastic Packages;" 48th Electronic Components and Technology Conference; May 25, 1998; pp. 1223-1234.
U.S. Appl. No. 12/840,324, filed Jul. 21, 2010, Cesaretti et al.
U.S. Appl. No. 12/959,672, filed Dec. 3, 2010, Doogue et al.
U.S. Appl. No. 12/968,353, filed Dec. 15, 2010, Donovan et al.
U.S. Appl. No. 13/095,371, filed Apr. 27, 2011, Cesaretti et al.
U.S. Appl. No. 13/350,970, filed Jan. 16, 2012, Milano et al.
U.S. Appl. No. 13/398,127, filed Feb. 16, 2012, Cesaeretti et al.
U.S. Appl. No. 13/424,618, filed Mar. 20, 2012, Doogue et al.
U.S. Appl. No. 13/526,106, filed Jun. 18, 2012, Vig et al.
U.S. Appl. No. 15/176,688, filed Jun. 8, 2016, David et al.
Daughton J: "Spin-dependent sensors", Proceedings of the IEEE New York, US, vol. 91. No. 5 May 1, 2003; 6 pages.
Donovan et al.; "Systems and Methods for Synchronizing Sensor Data;" U.S. Appl. No. 12/968,353, filed Dec. 15, 2010; 37 pages.
Kapser et al; "Integrated GMR Based Wheel Speed Sensor for Automotive Applications;" IEEE 2007 Conference on Sensors; Oct. 27, 2007; pp. 848-851.
Udo; "Limits of Offset Cancellation by the Principle of Spinning Current Hall Probe;" Proceedings of IEEE Sensors; Oct. 2004; pp. 1117-1120.
Amendment and RCE dated Sep. 9, 2015; for U.S. Appl. No. 13/946,400; 9 pages.
Decision to Grant dated Oct. 27, 2016; For European Pat. App. No. 13722619.7; 2 pages.
European Response filed on Aug. 24, 2016 to Official Communication dated Feb. 23, 2016; For European Pat. App. No. 14742423. 8; 17 pages.
Final Office Action dated Jun. 9, 2015; for U.S. Appl. No. 13/946,400; 17 pages.
Final Office Action dated Jul. 17, 2014; for U.S. Appl. No. 13/486,478; 13 pages.
Final Office Action dated Sep. 16, 2015; for U.S. Appl. No. 13/468,478; 19 pages.
Final Office Action dated Oct. 20, 2016; for U.S. Appl. No. 13/946,400; 34 pages.
Office Action dated Jan. 15, 2014; for U.S. Appl. No. 13/468,478; 36 pages.
Office Action dated Jan. 5, 2015; for U.S. Appl. No. 13/946,400; 56 pages.
Office Action dated Feb. 12, 2015; for U.S. Appl. No. 13/468,478; 14 pages.
Office Action dated Nov. 19, 2015; for U.S. Appl. No. 13/946,400; 24 pages.
Office Action dated May 10, 2016; for U.S. Appl. No. 13/468,478; 20 Pages.
Request for Continued Examination dated Jan. 19, 2015; For U.S. Appl. No. 13/468,478; 3 pages.
Request for Continued Examination dated Sep. 9, 2015; For U.S. Appl. No. 13/946,400; 2 pages.
Request for Continued Examination filed Jan. 14, 2016, For U.S. Appl. No. 13/468,478, 3 pages.
Response dated Jun. 12, 2014 to Office Action dated Jan. 15, 2014; For U.S. Appl. No. 13/468,478; 11 pages.
Response dated Jan. 19, 2015 to Final Office Action dated Jul. 17, 2014; For U.S. Appl. No. 13/468,478; 12 pages.
Response dated Apr. 3, 2015 to Office Action dated Jan. 5, 2015; for U.S. Appl. No. 13/946,400; 13 pages.
Response filed Jun. 16, 2015; to Office Action dated Feb. 12, 2015; for U.S. Appl. No. 13/468,478; 11 pages.
Response dated Jan. 14, 2016 to Final Office Action dated Sep. 16, 2015; For U.S. Appl. No. 13/468,478, 15 pages.
Response dated Feb. 17, 2016 to Non-Final Office Action dated Nov. 19, 2015; For U.S. Appl. No. 13/946,400; 11 pages.
Response dated Oct. 3, 2016 to Office Action dated May 10, 2016 for U.S. Appl. No. 13/468,478; 17 pages.
Rule 56 letter; for U.S. Appl. No. 13/946,400; 2 pages.
European Communication under Rule 71(3) EPC, Intention to Grant dated Jun. 2, 2016 corresponding to European Application No. 13722619.7; 7 Pages.
European Response dated May 21, 2015 to Written Opinion; for European Pat. App. No. 13722619.7, 15 pages.
Voluntary Amendment with English Claims dated Nov. 7, 2016 for Korean Pat. App. No. 10-2016-7004178; 15 pages.
Voluntary Amendment dated Nov. 2, 2016 with English claims for Chinese App. No. 201480040243.6; 13 pages.
Voluntary Amendment dated Dec. 28, 2016 with English claims; For Japanese Pat. App. No. 2016-528006; 8 pages.
Extended Search Report dated Dec. 22, 2016; For European Pat. App. No. 16193227.2-1586; 11 pages.
International Search Report and Written Opinion of the ISA dated Jul. 17, 2013; For PCT Pat. App. No. PCT/US2013/037065; 9 pages.
PCT International Preliminary Report on Patentability and Written Opinion of the ISA dated Nov. 20, 2014; For PCT Pat. App. No. PCT/US2013/037065; 11 pages.
International Search Report and Written Opinion dated Nov. 3, 2014 for Int'l PCT Application PCT/US2014/044993; 13 pages.
PCT International Preliminary Report on Patentability dated Jan. 28, 2016; For PCT Pat. App. No. PCT/US2014/044993; 9 pages.
Response to Japanese Office Action (with English claims) dated Oct. 3, 2017 for Japanese Application No. 2016-528006; Response filed Dec. 26, 2017; 8 Pages.
Response to U.S. Final Office Action dated Oct. 5, 2017 for U.S. Appl. No. 13/946,400; Response filed Jan. 5, 2018; 11 Pages.
Appeal Brief dated Sep. 19, 2017 from Japanese Application No. 2015-511491 with English translations; 14 Pages.
Pre-Trial Report dated Nov. 2, 2017 from Japanese Application No. 2015-511491 with English translations and Claims on File; 7 Pages.
Korean Office Action with English Translation dated Nov. 22, 2017 for Korean Application No. 10-2016-7004178; 17 Pages.
Non-final Office Action dated Dec. 15, 2017 for U.S. Appl. No. 15/176,688; 27 pages.
Korean Response (with English Language Summary) dated Jan. 19, 2018 for Korean Application No. 10-2016-7004178; 25 Pages.
Response to U.S. Office Action dated Dec. 15, 2017 for U.S. Appl. No. 15/176,668; Response filed on Feb. 9, 2018; 13 Pages.
Notice of Allowance dated Apr. 4, 2018 for U.S. Appl. No. 13/946,400; 11 pages.

\* cited by examiner

MAGNETIC FIELD SENSOR FOR SENSING A PROXIMITY OF AN OBJECT

CROSS REFERENCE TO RELATED APPLICATIONS

Not Applicable.

STATEMENT REGARDING FEDERALLY SPONSORED RESEARCH

Not Applicable.

FIELD

This invention relates generally to magnetic field sensors, and, more particularly, to magnetic field sensors having a magnet and a substrate with magnetic field sensing elements thereupon, all arranged in a variety of relative positions and all acting as proximity detectors.

BACKGROUND

Various types of magnetic field sensing elements are known, including Hall Effect elements and magnetoresistance elements. Magnetic field sensors generally include a magnetic field sensing element and other electronic components. Some magnetic field sensors also include a permanent magnet in a so-called "back biased" arrangement described more fully below.

Magnetic field sensors provide an electrical signal representative of a sensed magnetic field. In some embodiments that have the magnet in a so-called back-biased arrangement, a magnetic field sensed by a magnetic field sensor is a magnetic field generated by the magnet. In these back-biased arrangements, in the presence of a ferromagnetic object, the magnetic field generated by the magnet and sensed by the magnetic field sensor varies in accordance with proximity of the ferromagnetic object to the magnetic field sensor.

In some arrangements, the output signal from the magnetic field sensor is a "non-linear" two state signal having a first state indicative of a ferromagnetic object being distal from the magnetic field sensor and a second different state indicative of the ferromagnetic object being proximate to the magnetic field sensor. In other arrangements the output signal from the magnetic field sensor is a "linear" (analog or digital) signal having a signal value indicative of a distance between the ferromagnetic object and the magnetic field sensor. A magnetic field sensor having either of the above signal characteristics can be referred to as a "proximity sensor."

Conventional back-biased proximity sensors typically use a single ended configuration with one magnetic field sensing element, typically a planar Hall effect element, with a maximum response axis that intersects the ferromagnetic object.

It would be desirable to provide a back-biased proximity sensor that uses a different type of magnetic field sensing element, different than a planar Hall effect element.

It is known that differential arrangements can offer advantages not found in conventional proximity sensors. For example, in general, a differential arrangement that uses two magnetic field sensing elements can be non-responsive to undesirable external magnetic fields that are equally received by the two magnetic field sensing elements.

A differential arrangement using two planar Hall effect elements would not function properly as a proximity sensor, because both of the two planar Hall effect elements would respond in the same way to a proximate ferromagnetic object and a resulting differential combination would have no output.

Therefore, it would be desirable to provide a back-biased proximity sensor that has a differential arrangement.

SUMMARY

The present invention provides a back-biased magnetic field sensor (proximity sensor) that uses a different type of magnetic field sensing element, different than a planar Hall effect element.

In some embodiments, the present invention provides a back-biased proximity sensor that has a differential arrangement.

In accordance with an example useful for understanding an aspect of the present invention, a magnetic field sensor can sense a movement of a ferromagnetic object along a path, a movement line tangent to the path. The magnetic field sensor can include a magnet and a semiconductor substrate proximate to the magnet and at a position between the ferromagnetic object and the magnet. The semiconductor substrate can include first and second orthogonal axes on the first opposing surface of the substrate intersecting at a coordinate axes point, and a substrate region upon the first opposing surface of the substrate, the substrate region proximate to and surrounding the coordinate axis point, wherein magnetic fields generated by the magnet at the substrate region are substantially perpendicular to the semiconductor substrate in the absence of the ferromagnetic object. The magnetic field sensor can further include a first magnetic field sensing element disposed on or under the first surface of the semiconductor substrate and disposed outside of the substrate region, wherein the first magnetic field sensing element comprises an axis of maximum sensitivity substantially parallel to the first orthogonal axis, wherein a center of the first magnetic field sensing element is disposed along the first orthogonal axis.

BRIEF DESCRIPTION OF THE DRAWINGS

The foregoing features of the invention, as well as the invention itself may be more fully understood from the following detailed description of the drawings, in which.

DETAILED DESCRIPTION

Figures 1, 2:
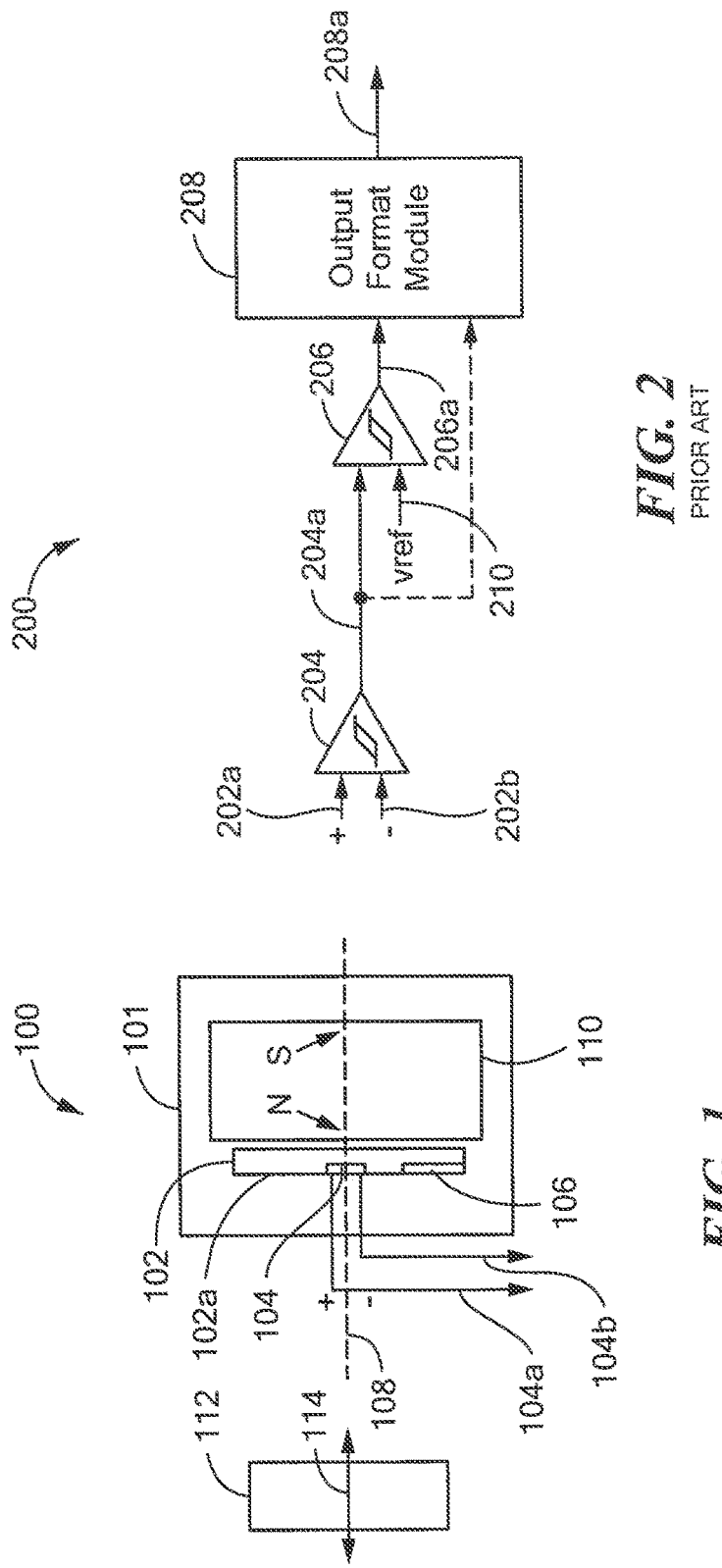
FIG. 1 is a block diagram showing a prior art magnetic field sensor forming a back-biased magnetic field sensor having one planar Hall effect element and an associated electronic circuit, all upon a semiconductor substrate, along with a back-biasing magnet, the back-biased proximity sensor proximate to a ferromagnetic object.
FIG. 2 is a block diagram showing a prior art electronic circuit that can be used in the prior art back-biased proximity sensor of FIG. 1.

Before describing the present invention, some introductory concepts and terminology are explained.

As used herein, the term "magnetic field sensing element" is used to describe a variety of electronic elements that can sense a magnetic field. The magnetic field sensing element can be, but is not limited to, a Hall Effect element, a magnetoresistance element, or a magnetotransistor. As is known, there are different types of Hall Effect elements, for example, a planar Hall element, a vertical Hall element, and a Circular Vertical Hall (CVH) element. As is also known, there are different types of magnetoresistance elements, for example, a semiconductor magnetoresistance element such as Indium Antimonide (InSb), a giant magnetoresistance (GMR) element, an anisotropic magnetoresistance element (AMR), a tunneling magnetoresistance (TMR) element, and a magnetic tunnel junction (MTJ). The magnetic field sensing element may be a single element or, alternatively, may include two or more magnetic field sensing elements arranged in various configurations, e.g., a half bridge or full (Wheatstone) bridge. Depending on the device type and other application requirements, the magnetic field sensing element may be a device made of a type IV semiconductor material such as Silicon (Si) or Germanium (Ge), or a compound semiconductor material like Gallium-Arsenide (GaAs) or an Indium compound, e.g., Indium-Antimonide (InSb), or InGaA.

As is known, some of the above-described magnetic field sensing elements tend to have an axis of maximum sensitivity substantially parallel to a substrate that supports the magnetic field sensing element, and others of the above-described magnetic field sensing elements tend to have an axis of maximum sensitivity substantially perpendicular to a substrate that supports the magnetic field sensing element. In particular, planar Hall elements tend to have axes of sensitivity substantially perpendicular to a substrate, while metal based or metallic magnetoresistance elements (e.g., GMR, TMR, AMR) and vertical Hall elements tend to have axes of sensitivity parallel to a substrate.

As used herein, the term "magnetic field sensor" is used to describe a circuit that uses a magnetic field sensing element, generally in combination with other circuits. Magnetic field sensors are used in a variety of applications, including, but not limited to, an angle sensor that senses an angle of a direction of a magnetic field, a current sensor that senses a magnetic field generated by a current carried by a current-carrying conductor, a magnetic switch that senses the proximity of a ferromagnetic object, a rotation detector that senses passing ferromagnetic articles, for example, magnetic domains of a ring magnet, and a magnetic field sensor that senses a magnetic field density of a magnetic field.

The terms "parallel" and "perpendicular" are used in various contexts herein. It should be understood that the terms parallel and perpendicular do not require exact perpendicularity or exact parallelism, but instead it is intended that normal manufacturing tolerances apply, which tolerances depend upon the context in which the terms are used. In some instances, the term "substantially" is used to modify the terms "parallel" or "perpendicular." In general, use of the term "substantially" reflects angles that are beyond manufacturing tolerances, for example, within +/−ten degrees.

As used herein, the term "baseline" and the phrase "baseline level" are used to describe a lowest magnitude (which may be near zero or may be some other magnetic field) of a magnetic field experienced by a magnetic field sensing element within a magnetic field sensor when the magnetic field sensor is operating in a system.

As used herein, the term "processor" is used to describe an electronic circuit that performs a function, an operation, or a sequence of operations. The function, operation, or sequence of operations can be hard coded into the electronic circuit or soft coded by way of instructions held in a memory device. A "processor" can perform the function, operation, or sequence of operations using digital values or using analog signals.

In some embodiments, the "processor" can be embodied in an application specific integrated circuit (ASIC), which can be an analog ASIC or a digital ASIC. In some embodiments, the "processor" can be embodied in a microprocessor with associated program memory. In some embodiments, the "processor" can be embodied in a discrete electronic circuit, which can be an analog or digital.

As used herein, the term "module" is used to describe a "processor."

A processor can contain internal processors or internal modules that perform portions of the function, operation, or sequence of operations of the processor. Similarly, a module can contain internal processors or internal modules that perform portions of the function, operation, or sequence of operations of the module.

While electronic circuits shown in figures herein may be shown in the form of analog blocks or digital blocks, it will be understood that the analog blocks can be replaced by digital blocks that perform the same or similar functions and the digital blocks can be replaced by analog blocks that perform the same or similar functions. Analog-to-digital or digital-to-analog conversions may not be explicitly shown in the figures, but should be understood.

As used herein, the term "predetermined," when referring to a value or signal, is used to refer to a value or signal that is set, or fixed, in the factory at the time of manufacture, or by external means, e.g., programming, thereafter. As used herein, the term "determined," when referring to a value or signal, is used to refer to a value or signal that is identified by a circuit during operation, after manufacture.

As used herein, the term "active electronic component" is used to describe an electronic component that has at least one p-n junction. A transistor, a diode, and a logic gate are examples of active electronic components. In contrast, as used herein, the term "passive electronic component" as used to describe an electronic component that does not have at least one p-n junction. A capacitor and a resistor are examples of passive electronic components.

Planar and vertical Hall effect elements and also magnetoresistance elements are described herein as coupled to examples of electronic circuits. For the planar and vertical Hall effect elements, while not explicitly shown, current spinning (also referred to as chopping) techniques can be used along with associated circuit elements that are not shown in the figures. Current spinning can be used to reduce a DC offset error (non-zero signal when in the presence of a zero magnetic field) otherwise present in an output signal directly from a planar or vertical Hall effect element.

Current spinning will be understood to be a known technique with known electronic circuit elements that can, at a first coupling "phase," couple a drive current to drive a current between particular selected drive terminals of a planar or vertical Hall effect element. At the first coupling phase, a differential output signal can be generated between two terminals of the planar or vertical Hall effect element that are not used as the drive terminals of the first coupling phase. Sequentially, at a second coupling phase, the known electronic circuit elements can couple the drive current to drive a current between other particular selected terminals of the planar or vertical Hall effect element. At the second coupling phase, a differential output signal can be generated between two terminals of the planar or vertical Hall effect element that are not used as the drive terminals of the second coupling phase. There can be more than two such coupling phases, for example, four coupling phases. The sequential output signals can be averaged to result in a lower effective offset voltage.

Referring now to FIG. 1, a prior art magnetic field sensor 101 can provide a back-biased proximity sensor 101 used to sense a proximity of a ferromagnetic object 112 or absence thereof.

The back-biased proximity sensor 101 can include a planar Hall effect element 104 and an electronic circuit 106 coupled thereto, both disposed in or on (i.e., over) an electronic substrate 102. The planar Hall effect element 104 can have an axis of maximum sensitivity substantially perpendicular to a major surface 102a of the substrate 102, i.e., along an axis 108.

The back-biased proximity sensor 101 can also include a back-biasing magnet 110 having north and south poles arranged along the axis 108.

The back-biased proximity sensor 101 can include a molded structure that encases the substrate 102 and the magnet 108.

In operation, the planar Hall effect element 104 can generate a differential signal 104a, 104b, which can be coupled to the electronic circuit 106 to generate an output signal (not shown).

As a ferromagnetic object 112 comes closer to the back-biased proximity sensor 101, the differential signal 104a, 104b changes amplitude. The electronic circuit 106 can process the differential signal 104a, 104b in circuits described in conjunction with FIG. 2.

Referring now to FIG. 2, an electronic circuit 200 is an example of the electronic circuit 106 of FIG. 1. As described above, while not shown, in some embodiments, the electronic circuit 200 can include other circuit elements to generate the above-described current spinning.

An amplifier 204 can be coupled to receive a differential signal 202a, 202b, representative of the differential signal 104a, 104b, with or without the above-described current spinning. The amplifier 204 can generate an amplified signal 204a In non-linear back biased proximity sensors, a comparator 206 (with or without hysteresis) can be coupled to the amplifier and coupled to a reference voltage 210 and can generate a two state (i.e., binary) signal 206a. The signal 206a can have a first state indicative of the ferromagnetic object 112 being distal from the back-biased proximity sensor 101 and a second different state indicative of the ferromagnetic object being proximate to the back-biased proximity sensor 101 (FIG. 1).

An output format module 208 can be coupled to the comparator 206 and can generate a formatted signal 208a indicative of at least the first and second different states.

In linear back biased proximity sensors, the amplified signal 204a can instead be coupled to the output format module 208 and can generate a formatted signal 206a indicative of a magnitude of the amplified signal 204a, which can be indicative of a distance between the ferromagnetic object 112 (FIG. 1) and the back-biased proximity sensor 101.

Figure 3:
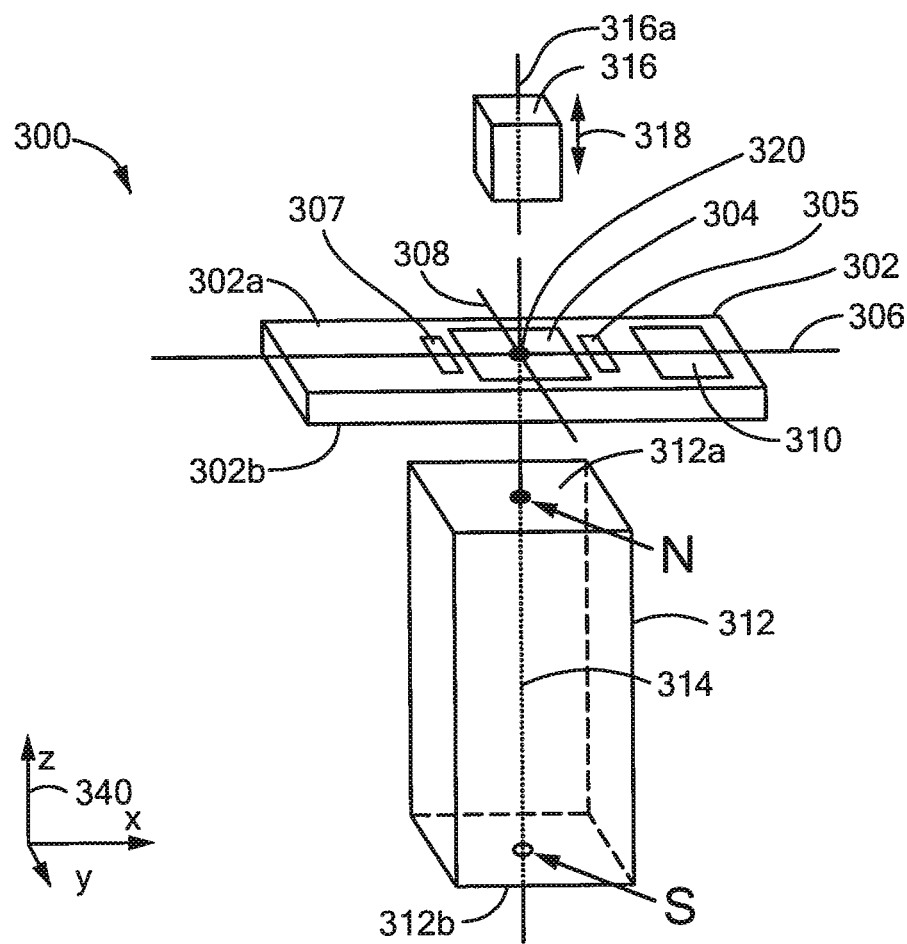
FIG. 3 is a block diagram showing a back-biased magnetic field sensor having a substrate region of a substrate, the substrate region described more particularly below, outside of which one or more magnetic field sensing elements are disposed, and an associated electronic circuit, all disposed upon the electronic substrate, along with a back-biasing magnet, the back-biased proximity sensor proximate to a ferromagnetic object.

Referring now to FIG. 3, a back-biased proximity sensor 300 is shown proximate to a ferromagnetic object 316, but does not include the ferromagnetic object 316.

The back-biased proximity sensor 300 can include an electronic substrate 302 having first and second major surfaces 302a, 302b. The substrate 302 can include a substrate region 304 and magnetic field sensing elements e.g., 305, 307, disposed on the first surface 302a and outside of the substrate region 304. The substrate region 304 is shown to be square. However, in other embodiments, the substrate region 304 can be rectangular, oval, round, or any other planar shape defined by characteristics below.

An electronic circuit 310 can be disposed in or on the first surface 302a and can be coupled to the magnetic field sensing element(s).

The back-biased proximity sensor 300 can include a magnet 312 having first and second opposing surfaces 312a, 312b, respectively. A north pole, N, can be disposed upon the first surface 312a and a south pole, S, can be disposed upon the second surface 312b. In some embodiments, the north pole, N, and the south pole, S, are reversed in position.

A magnet axis 314 passes through the north and south poles. In some embodiments, the magnet axis 314 can intersect the coordinate axis point 320.

Upon the first surface 302a of the substrate 302, first and second orthogonal axes 306, 308, respectively, intersect the at a coordinate axis point 320. The coordinate axis point 320 can be at a geometric center the coordinate axis region 304.

In some embodiments, the magnetic axis 314 can intersect the coordinate axis point 320. However, more generally, the substrate region 304 is a region in which magnetic fields generated by the magnet 312 are substantially perpendicular to the first surface 302a of the substrate 302. Further, outside of the substrate region 304, magnetic fields are not substantially perpendicular to the surface 302a.

In general, in some embodiments, the substrate region 304 has a size and a shape selected to provide that, when the ferromagnetic object 316 is not present, the magnetic fields at the surface 302a of the substrate 302 are within about five degrees of perpendicular to the surface 302a, and outside of the substrate region 304, the magnetic fields are beyond about five degrees. However, the substrate region 304 can have other sizes and shapes to result in other magnetic field angles within and outside of the substrate region, for example, within the substrate region 304 less than about two degrees, less than about five degrees, less than about ten, less than about fifteen, less than about twenty, less than about twenty-five, less than about thirty, less than about thirty-five forty, or less than about forty-five degrees. Thus, outside of the substrate region 304, angles of magnetic field lines are greater than or equal to the above-described angles. A preferred magnetic field angle is zero or near zero.

The back-biased proximity sensor 300 can be used to sense the ferromagnetic object 316 at different positions along a direction 318. In some embodiments, the back-biased proximity sensor 300 can have a central axis 316a and the central axis can be aligned with the coordinate axis point 320 at the different positions along the direction 318. The direction 318 can be tangent to a movement line, which may or may not be a straight movement line. In some embodiments, the direction 318 is perpendicular to the first surface 302a of the substrate 302. However, other angles are also possible.

A coordinate axis 340 is consistent among the various figures below, in which the surface 302a of the substrate is in an x-y plane.

Unlike the back-biased proximity sensor 300, it should be understood that, for the conventional back-biased proximity sensor 101 of FIG. 1, the planar Hall effect element 104 is within, rather than outside of, a comparable substrate region, resulting in magnetic fields at the planar Hall effect element 104 being substantially perpendicular to the surface 102a of the substrate 102.

Figure 4:
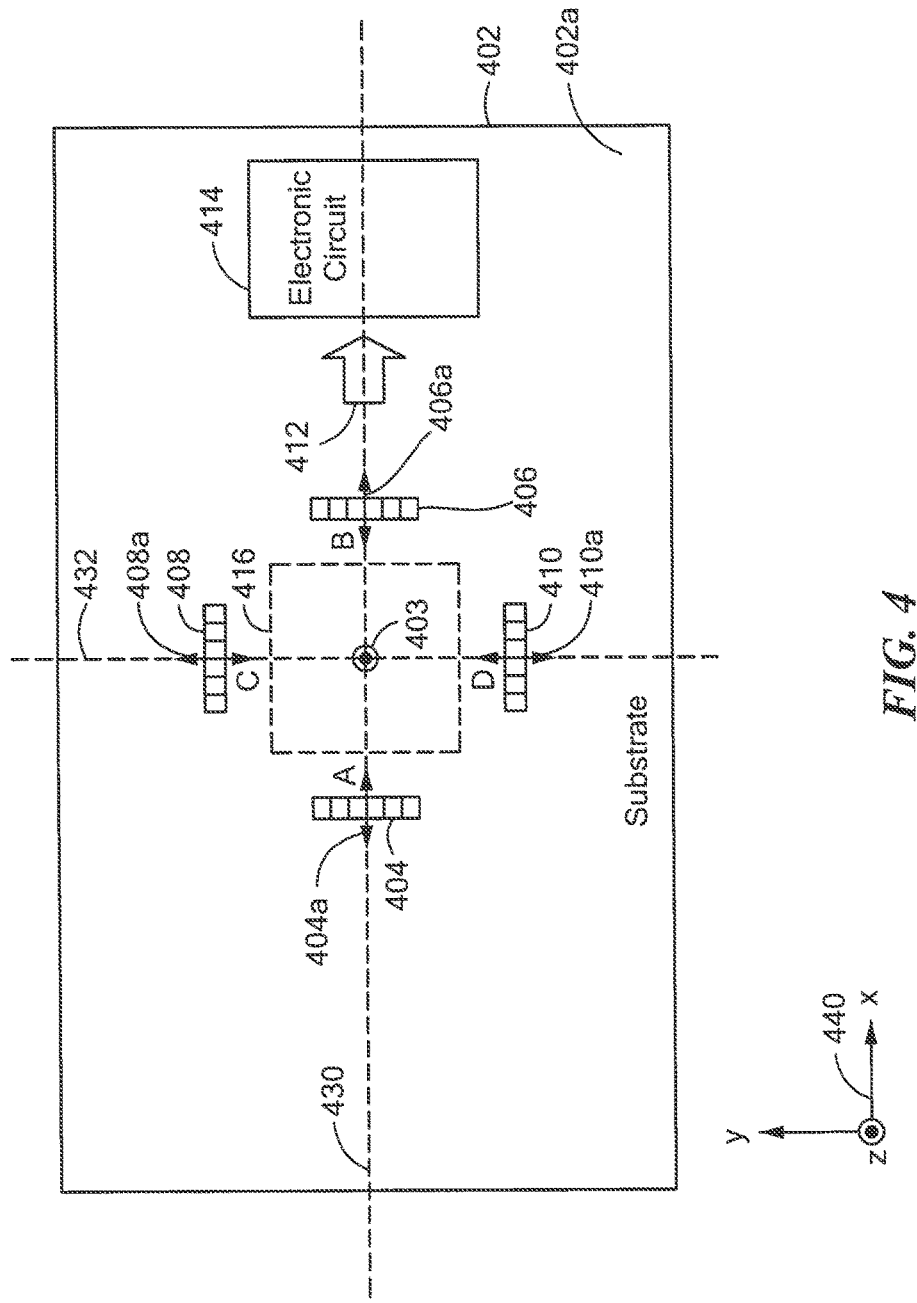
FIG. 4 is a block diagram showing a top view of the substrate of the back-biased proximity sensor according to FIG. 3 and having four magnetic field sensing elements shown as vertical Hall effect elements, disposed outside of the above-mentioned semiconductor region, and an electronic circuit.

While the first surface 302a can be toward the ferromagnetic object 316 as shown, in other embodiments, the first surface 302a can be toward the magnet Referring now to FIG. 4, a substrate 402 with first surface 402a can be the same as or similar to the substrate 302 with the first surface 302a of FIG. 3. A substrate region 416 with a coordinate axis point 403 can be the same as or similar to the substrate region 304 with the coordinate axis point 320 of FIG. 4. An electronic circuit 414 can be the same as or similar to the electronic circuit 310 of FIG. 3. A first coordinate axis 430 and a second coordinate axis 432 can be the same as or similar to first and second coordinate axis points 306, 308, respectively, of FIG. 3.

First, second, third and fourth vertical Hall elements 404, 406, 408, 410 can be disposed on, in, or under the first surface 402a of the substrate 402 and outside of the substrate region 416. Maximum response axes 404a, 406a of the first and second vertical Hall effect elements 404, 406, respectively, can be generally aligned with the first coordinate axis 430. Maximum response axes 408a, 410a of the third and fourth vertical Hall effect elements 408, 410, respectively, can be generally aligned with the second coordinate axis 432.

Cartesian coordinates 440 show that the first surface 402a of the substrate 402 can be in the same x-y plane identified in FIG. 3.

While four vertical Hall effect elements are shown, in other embodiments, there can be one, two, three, four, or more vertical Hall elements. Also, while the maximum response axes 404a, 406a, 408a, 410a of the magnetic field sensing elements 404, 406, 408, 410, respectively, are shown to be aligned with first and second coordinate axes 430, 432, respectively, in other embodiments, the maximum response axes can be at other angles.

For embodiments that use one vertical Hall effect element, the one vertical Hall effect element can be any one of the four vertical Hall effect elements 404, 406, 408, 410. For embodiments that use two vertical Hall effect elements, the two vertical Hall effect elements can be any two of the four vertical Hall effect elements. For embodiments that use three vertical Hall effect element, the three vertical Hall effect element scan be any three of the four vertical Hall effect elements In general, it will be understood that having more than one vertical Hall effect element has advantages. For example, a signal to noise ratio can be improved by using more than one vertical Hall effect element.

Figure 5:
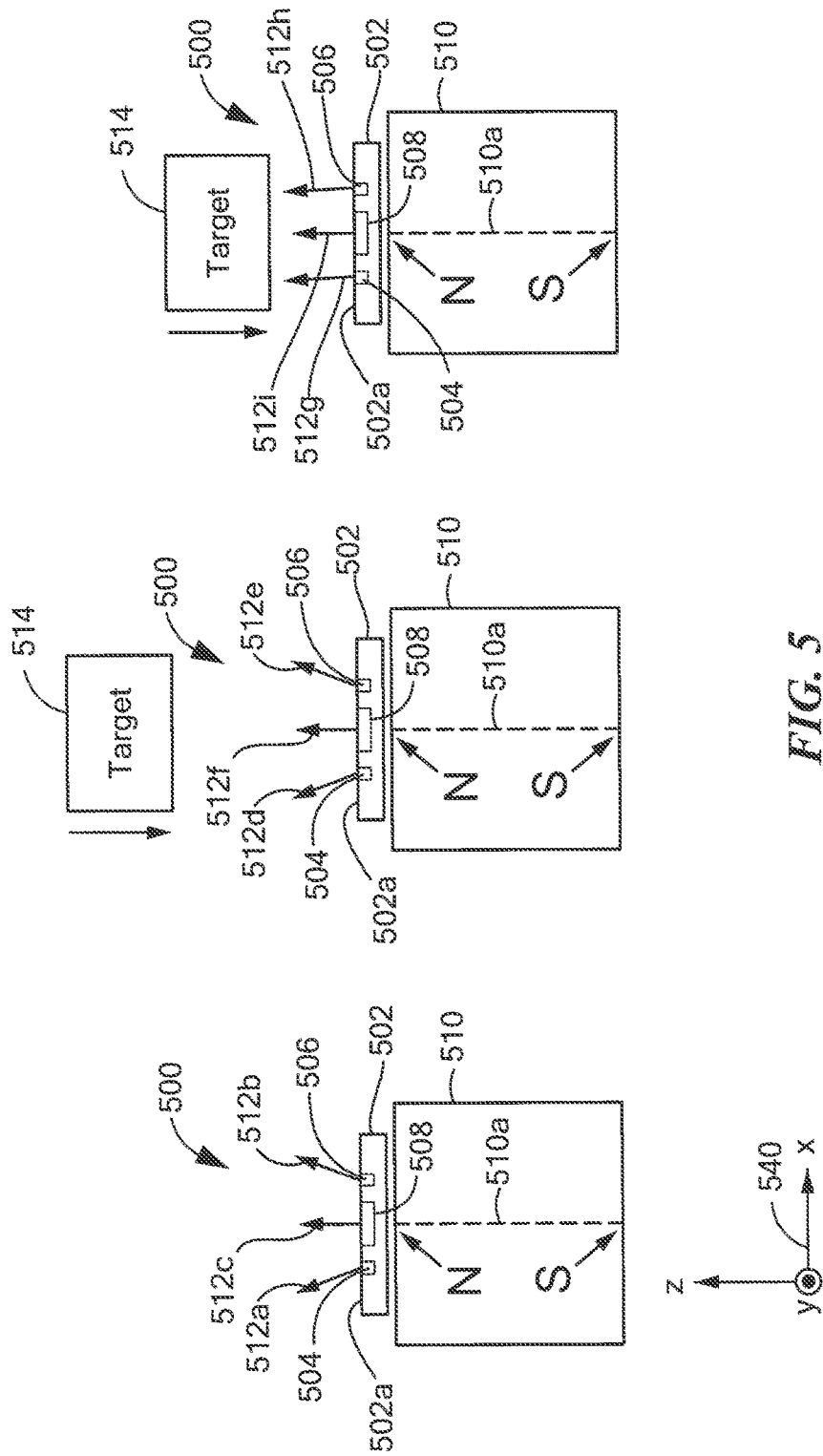
FIG. 5 is a block diagram showing a side view of a back-proximity sensor according to the back-biased proximity sensor of FIGS. 3 and 4 and showing different magnetic field line directions when in the presence of no ferromagnetic object and when the ferromagnetic object is closer to the back-biased proximity sensor.

Referring now to FIG. 5, a back-biased magnetic field sensor 500 is shown in three views as a ferromagnetic object 514 approaches.

The back-biased magnetic field sensor 500 can be the same as or similar to the magnetic field sensor 300 of FIG. 3. The back-biased magnetic field sensor 500 can include a magnet 510 with a magnet axis 510a, which can be the same as or similar to the magnet 312 with the magnet axis 314 of FIG. 3. The back-biased magnetic field sensor 500 can include a substrate 502 with a first surface 502a, which can be the same as or similar to the substrate 402 with the first surface 402a of FIG. 4 and the same as or similar to the substrate 302 with the first surface 302a of FIG. 3.

First, second, and fourth vertical Hall effect elements 504, 506, 508 can be the same as or similar to the first, second, and fourth vertical Hall effect elements 404, 406, 410 of FIG. 4. A third vertical Hall effect element comparable to the third vertical Hall effect element 408 is not shown for clarity.

In a left hand view, no ferromagnetic object (e.g., 514) is proximate to the back-biased magnetic field sensor 500. Magnetic field line 512a is representative of a magnetic field direction at the first vertical Hall effect element 504, and is tilted in an x-y plane in Cartesian coordinates 540, within an x-z plane, and tilted in a negative x direction. Magnetic field line 512b is representative of a magnetic field direction at the second vertical Hall effect element 506, and is tilted in the x-y plane in Cartesian coordinates 540, within the x-z plane, and tilted in a positive x direction. Magnetic field line 512c is representative of a magnetic field direction at the fourth vertical Hall effect element 508, and is tilted in the x-y plane in Cartesian coordinates 540, within a y-z plane, and tilted in a positive y direction.

Due to the directions of the maximum response axes 404a, 406a, 410a of FIG. 4, it should be recognized that the first, second, and fourth vertical Hall effect elements 504, 506, 508 have non-zero output signals related to projections of the magnetic field lines 512a, 512b, 512c upon respective maximum response axes.

In the second and third panels of FIG. 5, as the ferromagnetic object 514 approaches, magnetic field lines 512d, 512e, 512f and then magnetic field lines 512g, 512h, 512i become progressively more vertical, i.e., aligned with the z axis of the Cartesian coordinated 540. Accordingly, output signals from the first, second, and fourth vertical Hall effect elements 504, 506, 508 progressively smaller. The change in magnitude of the output signal can be detected to indicate a separation (or a separation threshold) associated with proximity of the ferromagnetic object 514 from the magnetic field sensor 500.

Figure 6:
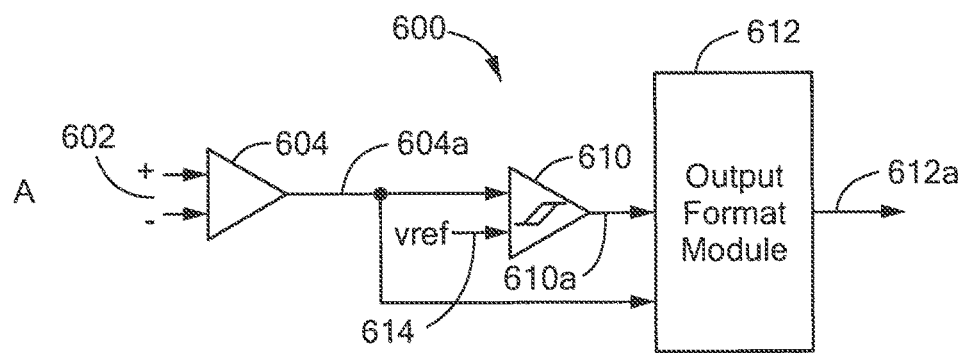
FIG. 6 is a block diagram showing further details of an example of the electronic circuit of the back-biased proximity sensor FIG. 3 when the back-biased proximity sensor uses one vertical Hall effect element.
Figure 7:
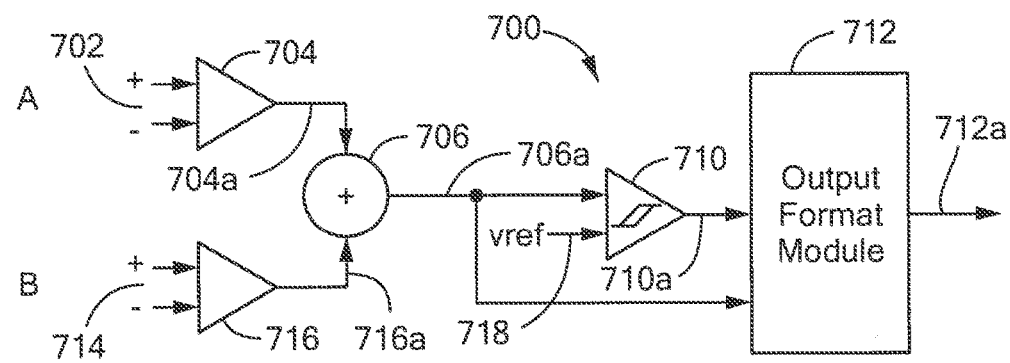
FIG. 7 is a block diagram showing further details of an example of the electronic circuit of the back-biased proximity sensor FIG. 3 when the back-biased proximity sensor uses two vertical Hall effect elements.
Figure 8:
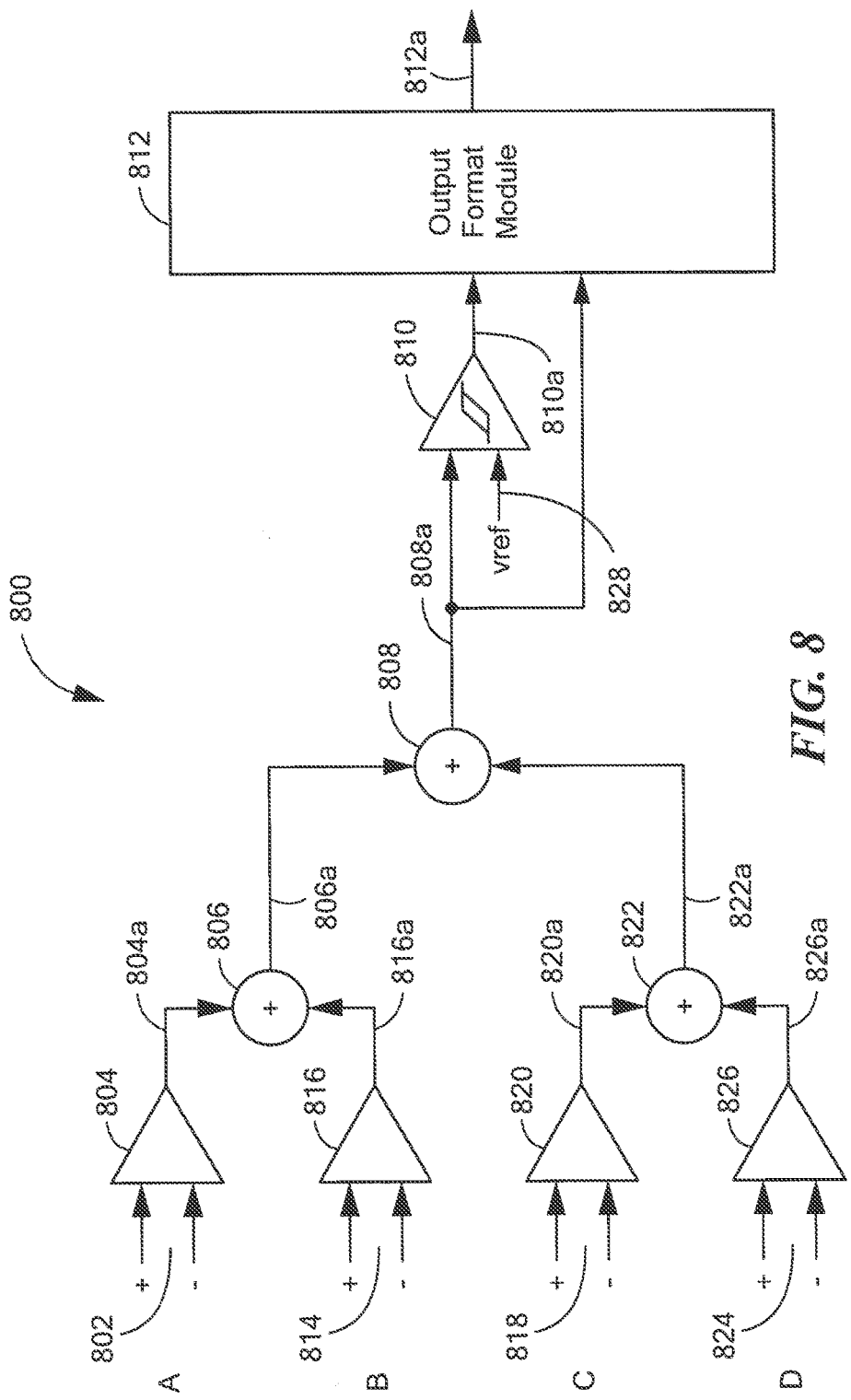
FIG. 8 is a block diagram showing further details of an example of the electronic circuit of the back-biased proximity sensor FIG. 3, when the back-biased proximity sensor uses four vertical Hall effect elements as shown in FIG. 4.

FIGS. 6-8 below show representative electronic circuits that can be used to detect the above-described proximity of the ferromagnetic object 514 to the magnetic field sensor, having one, two, or four vertical Hall effect elements. In each of FIGS. 6-8, while not shown, in some embodiments, circuits can be used that accomplish current spinning described above. However, in other embodiments, current spinning is not used.

Referring now to FIG. 6, an electronic circuit 600 can be the same as or similar to the electronic circuit 414 of FIG. 4, but using only one vertical Hall effect element, for example, the first vertical Hall element 404 of FIG. 4. While it is indicated that the first vertical Hall effect element 404 is used with the electronic circuit 600, in other embodiments, the vertical Hall effect element that is used can be any one of the vertical Hall elements 404, 406, 408, 410 of FIG. 4.

The electronic circuit 600 can include an amplifier 604 coupled to receive a differential signal 602. The differential signal 602 can be coupled to a vertical Hall effect element.

The amplifier 604 can generate an amplified signal 604a.

A comparator circuit 610 can be coupled to receive the amplified signal 604a and coupled to receive a reference signal 614. The comparator circuit 610 can be configured to generate a comparison signal 610 having a first state indicative of the ferromagnetic object 514 being far away from the magnetic field sensor 500 and having a second different state indicative of the ferromagnetic object 514 being near to the magnetic field sensor 500. The comparison signal 610a provides a nonlinear magnetic field sensor.

The comparator circuit 610 and other comparator circuits herein can be linear comparators. However, in other embodiments, the comparator circuits can be digital circuits configured to generate an output signal having at least two different states.

An output format module 612 can be coupled to receive the comparison signal 610a and can be configured to generate a formatted signal 612a indicative of the first or second different states of the comparison signal 610a. The formatted signal 612a can be in one of a variety of signal formats, including, but not limited to, a PWM (pulse width modulation) format, a SENT (single edge nibble transmission) format, an I2C (inter-integrated circuit) format, and a CAN (controller area network) format, each of which can be used to communicate from a sensor to a processor.

In some embodiments, the amplified signal 604a can be coupled to the output format module 612 and the formatted signal 612a can be indicative of a linear representation of an amplitude of the amplified signal 704a, i.e., a representation of a proximity of the ferromagnetic object 514, either a continuous linear representation or a multi-step digital representation.

Referring now to FIG. 7, an electronic circuit 700 can be the same as or similar to the electronic circuit 414 of FIG. 4, but using two vertical Hall effect element, for example, the first and second vertical Hall elements 404, 406, respectively, of FIG. 4. While it is indicated that the first and second vertical Hall effect elements 404, 406 are used with the electronic circuit 700, in other embodiments, the vertical Hall effect elements can be any two of the vertical Hall elements 404, 406, 408, 410 of FIG. 4.

The electronic circuit 700 can include amplifier 704, 716 coupled to receive differential signals 702, 714. The differential signals 702, 714 can be coupled to two respective vertical Hall effect elements.

The amplifiers 704, 716 can generate amplified signals 704a, 716a. A summing circuit 706 can receive and sum the amplified signals 704a, 716a and can generate a summed signal 706a.

A comparator circuit 710 can be coupled to receive the summed signal 706a and coupled to receive a reference signal 718. The comparator circuit 710 can be configured to generate a comparison signal 710 having a first state indicative of the ferromagnetic object 514 being far away from the magnetic field sensor 500 and having a second different state indicative of the ferromagnetic object 514 being near to the magnetic field sensor 500. The comparison signal 710a provides a nonlinear magnetic field sensor.

An output format module 712 can be coupled to receive the comparison signal 710a and can be configured to generate a formatted signal 712a indicative of the first or second different states of the comparison signal 710a. The formatted signal 712a can be in one of a variety of signal formats, including, but not limited to, a PWM format, a SENT format, an I2C format, and a CAN format.

In the some embodiments, the summed signal 706a can be coupled to the output format module 712 and the formatted signal 712a can be indicative of a linear representation of an amplitude of the summed signal 706a, i.e., a representation of a proximity of the ferromagnetic object 514, either a continuous linear representation or a multi-step digital representation.

Referring now to FIG. 8, an electronic circuit 800 can be the same as or similar to the electronic circuit 414 of FIG. 4, but using four vertical Hall effect element, for example, the first, second, third, and fourth vertical Hall elements 404, 406, 408, 410, respectively, of FIG. 4. While it is indicated that the first, second, third, and fourth vertical Hall elements 404, 406, 408, 410 are used with the electronic circuit 800, in other embodiments, more than four vertical Hall effect elements can be used.

The electronic circuit 800 can include amplifier 804, 816, 820, 826 coupled to receive differential signals 802, 814, 818, 824. The differential signals 802, 814, 818, 824 can be coupled to four respective vertical Hall effect elements.

The amplifiers 804, 816, 820, 826 can generate amplified signals 804a, 816a, 820a, 826a. A summing circuit 806 can receive and sum the amplified signals 804a, 816a and can generate a summed signal 806a. A summing circuit 822 can receive and sum the amplified signals 820a, 826a and can generate a summed signal 822a. A summing circuit 808 can received the summed signals 806a, 822a and can generate a summed signal 808a.

A comparator circuit 810 can be coupled to receive the summed signal 808a and coupled to receive a reference signal 828. The comparator circuit 810 can be configured to generate a comparison signal 810 having a first state indicative of the ferromagnetic object 514 being far away from the magnetic field sensor 500 and having a second different state indicative of the ferromagnetic object 514 being near to the magnetic field sensor 500. The comparison signal 810a provides a nonlinear magnetic field sensor.

An output format module 812 can be coupled to receive the comparison signal 810a and can be configured to generate a formatted signal 812a indicative of the first or second different states of the comparison signal 810a. The formatted signal 812a can be in one of a variety of signal formats, including, but not limited to, a PWM format, a SENT format, an I2C format, and a CAN format.

In the some embodiments, the summed signal 808a can be coupled to the output format module 812 and the formatted signal 812a can be indicative of a linear representation of an amplitude of the summed signal 808a, i.e., a representation of a proximity of the ferromagnetic object 514, either a continuous linear representation or a multi-step digital representation.

While magnetic field sensors of FIGS. 2-8 are representative of one, two, three, four, or more vertical Hall effect elements, in other embodiments, each one of the vertical Hall effect elements can be replaced by one or more magnetoresistance elements. It will be understood that a both a vertical Hall effect element and a magnetoresistance element have maximum response axes parallel to a substrate upon which they are disposed.

Current spinning is not used with magnetoresistance elements. However, magnetoresistance elements can be used in bridge arrangements.

Figure 9:
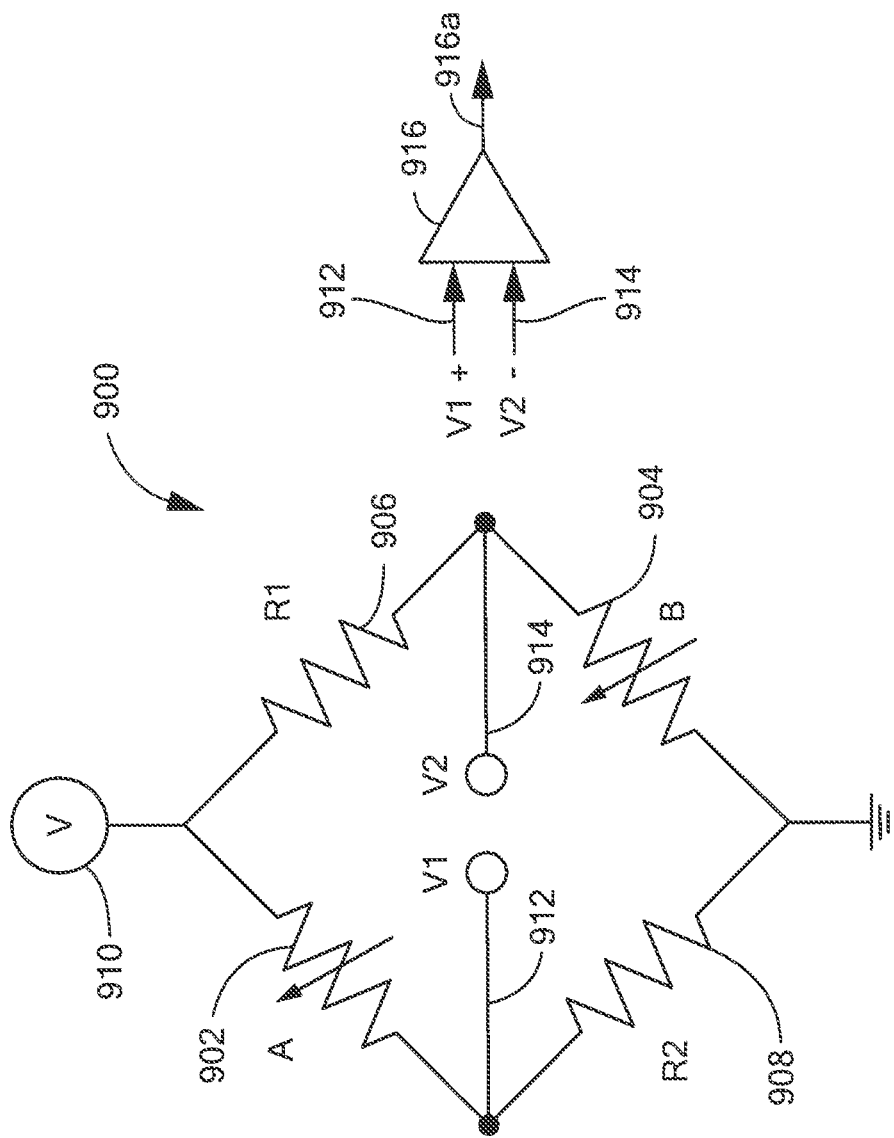
FIG. 9 is a block diagram showing magnetoresistance elements that can be used in the above proximity sensors in place of the vertical Hall effect elements.

Referring now to FIG. 9, a magnetoresistance element bridge 900 can use two magnetoresistance elements 902, 908, indicative of positions of the vertical Hall effect elements 404, 406, respectively, of FIG. 4. The magnetoresistance elements 902, 904 can be coupled to fixed resistors 906, 908. A differential signal 912, 914 can be coupled to an amplifier 916 to generate and amplified signal 916a. The amplifier 916 can be the same as or similar to any of the amplifiers of FIGS. 6-8.

In other embodiments, magnetoresistance elements can be used as any of the above-described vertical Hall effect elements but in a single ended arrangement.

All references cited herein are hereby incorporated herein by reference in their entirety.

Having described preferred embodiments, which serve to illustrate various concepts, structures and techniques, which are the subject of this patent, it will now become apparent that other embodiments incorporating these concepts, structures and techniques may be used. Accordingly, it is submitted that the scope of the patent should not be limited to the described embodiments but rather should be limited only by the spirit and scope of the following claims.

Elements of embodiments described herein may be combined to form other embodiments not specifically set forth above. Various elements, which are described in the context of a single embodiment, may also be provided separately or in any suitable subcombination. Other embodiments not specifically described herein are also within the scope of the following claims.

What is claimed is:

1. A magnetic field sensor for sensing a movement of a ferromagnetic object, the magnetic field sensor comprising:
    a magnet;
    a semiconductor substrate having first and second surfaces, the semiconductor substrate proximate to the magnet and at a position between the ferromagnetic object and the magnet, the semiconductor substrate comprising:
        first and second orthogonal axes on the first surface of the substrate intersecting at a coordinate axes point; and
        a substrate region upon the first opposing surface of the substrate, the substrate region proximate to and surrounding the coordinate axis point, wherein magnetic fields generated by the magnet within the substrate region are substantially perpendicular to the first and second surfaces of the semiconductor substrate in the absence of the ferromagnetic object, the magnetic field sensor further comprising:
    a first magnetic field sensing element disposed on or under the first surface of the semiconductor substrate and disposed outside of the substrate region, wherein the first magnetic field sensing element comprises an axis of maximum sensitivity substantially parallel to the first orthogonal axis, wherein a center of the first magnetic field sensing element is disposed along the first orthogonal axis;
    a second magnetic field sensing element disposed on or under the first surface of the semiconductor substrate and disposed outside of the semiconductor region, wherein the second magnetic field sensing element comprises an axis of maximum sensitivity substantially parallel to the axis of maximum sensitivity of the first magnetic field sensing element, and wherein a center of the second magnetic field sensing element is disposed along the first orthogonal axis;
    a third magnetic field sensing element disposed on or under the first surface of the semiconductor substrate and disposed outside of the semiconductor region, wherein the third magnetic field sensing element comprises an axis of maximum sensitivity substantially perpendicular to the axis of maximum sensitivity of the first magnetic field sensing element and substantially parallel to the first surface of the semiconductor substrate, and wherein a center of the third magnetic field sensing element is disposed along the second orthogonal axis;
    a fourth magnetic field sensing element disposed on or under the first surface of the semiconductor substrate and disposed outside of the semiconductor region, wherein the fourth magnetic field sensing element comprises an axis of maximum sensitivity substantially parallel to the axis of maximum sensitivity of the third magnetic field sensing element, wherein a center of the fourth magnetic field sensing element is disposed along the second orthogonal axis, wherein the centers of the first and second magnetic field sensing elements are substantially equidistant from and on opposite sides of the coordinate axes point, and wherein the centers of the third and fourth magnetic field sensing elements are substantially equidistant from and on opposite sides of the coordinate axes point; and
    an electronic circuit disposed upon the substrate, configured to combine signals from the first, second, third, and fourth magnetic field sensing elements to generate a combined signal, and configured to compare the combined signal with a threshold signal to generate a two-state binary signal having a change of state when the ferromagnetic object moves closer to the semiconductor substrate than a predetermined distance.

2. The magnetic field sensor of claim 1, wherein the centers of the first and second magnetic field sensing elements are substantially equidistant from and on opposite sides of the coordinate axes point.

3. The magnetic field sensor of claim 1, wherein the first and second magnetic field sensing elements comprise vertical Hall effect elements.

4. The magnetic field sensor of claim 1, wherein the first and second magnetic field sensing elements comprise magnetoresistance elements.

5. The magnetic field sensor of claim 1, wherein the first, second, third, and fourth magnetic field sensing elements comprise vertical Hall effect elements.

6. The magnetic field sensor of claim 1, wherein the first, second, third, and fourth magnetic field sensing elements comprise magnetoresistance elements.

7. The magnetic field sensor of claim 1, wherein magnetic fields generated by the magnet outside of the substrate region are tilted relative to the first and second surfaces of the semiconductor substrate in the absence of the ferromagnetic object, and wherein the magnetic fields generated by the magnet at the centers of the first and second magnetic field sensing elements outside of the substrate region tilt less relative to the first and second surfaces of the semiconductor substrate as the ferromagnetic object approaches the magnetic field sensor.

8. The magnetic field sensor of claim 1, wherein the two state binary signal changes state when the ferromagnetic object approaches the magnetic field sensor in a straight line toward the magnetic field sensor.

9. A magnetic field sensor for sensing a movement of a ferromagnetic object, the magnetic field sensor comprising:
   a magnet;
   a semiconductor substrate having first and second surfaces, the semiconductor substrate proximate to the magnet and at a position between the ferromagnetic object and the magnet, the semiconductor substrate comprising:
      first and second orthogonal axes on the first surface of the substrate intersecting at a coordinate axes point; and
      a substrate region upon the first opposing surface of the substrate, the substrate region proximate to and surrounding the coordinate axis point, wherein magnetic fields generated by the magnet within the substrate region are substantially perpendicular to the first and second surfaces of the semiconductor substrate in the absence of the ferromagnetic object, the magnetic field sensor further comprising:
   a first magnetic field sensing element disposed on or under the first surface of the semiconductor substrate and disposed outside of the substrate region, wherein the first magnetic field sensing element comprises an axis of maximum sensitivity substantially parallel to the first orthogonal axis, wherein a center of the first magnetic field sensing element is disposed along the first orthogonal axis;
   a second magnetic field sensing element disposed on or under the first surface of the semiconductor substrate and disposed outside of the substrate region, wherein the second magnetic field sensing element comprises an axis of maximum sensitivity substantially perpendicular to the axis of maximum sensitivity of the first magnetic field sensing element and substantially parallel to the first surface of the semiconductor substrate, wherein a center of the second magnetic field sensing element is disposed along the second orthogonal axis; and
   an electronic circuit disposed upon the substrate, coupled to the first and second magnetic field sensing elements and configured to combine first and second signals from the first and second magnetic field sensing elements to generate a combined signal, and configured to compare the combined signal with a reference signal to generate a two-state binary signal having a change of state when the ferromagnetic object moves closer to the semiconductor substrate than a predetermined distance.

10. The magnetic field sensor of claim 9, wherein the centers of the first and second magnetic field sensing elements are substantially equidistant from the coordinate axes point.

11. The magnetic field sensor of claim 9, wherein the first and second magnetic field sensing elements comprise vertical Hall effect elements.

12. The magnetic field sensor of claim 9, wherein the first and second magnetic field sensing elements comprise magnetoresistance elements.

13. The magnetic field sensor of claim 9, further comprising:
   a third magnetic field sensing element disposed on or under the first surface of the semiconductor substrate and disposed outside of the semiconductor region, wherein the third magnetic field sensing element comprises an axis of maximum sensitivity substantially perpendicular to the axis of maximum sensitivity of the first magnetic field sensing element and substantially parallel to the first surface of the semiconductor substrate, and
   a fourth magnetic field sensing element disposed on or under the first surface of the semiconductor substrate and disposed outside of the semiconductor region, wherein the fourth magnetic field sensing element comprises an axis of maximum sensitivity substantially parallel to the axis of maximum sensitivity of the third magnetic field sensing element.

14. The magnetic field sensor of claim 13, wherein a center of the third magnetic field sensing element is disposed along the first orthogonal axis, wherein a center of the fourth magnetic field sensing element is disposed along the second orthogonal axis, wherein the centers of the first and second magnetic field sensing elements are substantially equidistant from and on opposite sides of the coordinate axes point, and wherein the centers of the third and fourth magnetic field sensing elements are substantially equidistant from and on opposite sides of the coordinate axes point.

15. The magnetic field sensor of claim 13, wherein the electronic circuit is further configured to combine third and fourth signals from the third and fourth magnetic field sensing elements with the first and second signals to generate the combined signal.

16. The magnetic field sensor of claim 9, wherein magnetic fields generated by the magnet outside of the substrate region are tilted relative to the first and second surfaces of the semiconductor substrate in the absence of the ferromagnetic object, and wherein the magnetic fields generated by the magnet at the centers of the first and second magnetic field sensing elements are less tilted relative to the first and second surfaces of the semiconductor substrate as the ferromagnetic object approaches the magnetic field sensor.

17. The magnetic field sensor of claim 9, wherein the two state binary signal changes state when the ferromagnetic object approaches the magnetic field sensor in a straight line toward the magnetic field sensor.

* * * * *

UNITED STATES PATENT AND TRADEMARK OFFICE
CERTIFICATE OF CORRECTION

| | |
|---|---|
| PATENT NO. | : 10,012,518 B2 |
| APPLICATION NO. | : 15/176645 |
| DATED | : July 3, 2018 |
| INVENTOR(S) | : Paul A. David et al. |

It is certified that error appears in the above-identified patent and that said Letters Patent is hereby corrected as shown below:

Column 2, Line 22, delete "a movement" and replace with --with a movement--.

Column 2, Line 28, delete "axes point," and replace with --axis point,--.

Column 3, Line 5, delete "back-proximity" and replace with --back-biased proximity--.

Column 3, Line 12, delete "sensor FIG. 3" and replace with --sensor of FIG. 3--.

Column 3, Line 16, delete "sensor FIG. 3" and replace with --sensor of FIG. 3--.

Column 3, Line 21, delete "sensor FIG. 3," and replace with --sensor of FIG. 3--.

Column 4, Line 23, delete "+/-ten degrees." and replace with --+/- ten degrees.--.

Column 5, Lines 5-6, delete "as used" and replace with --is used--.

Column 6, Lines 52-53, delete "intersect the at a" and replace with --intersect at a--.

Column 6, Line 54, delete "center the coordinate axis region 304." and replace with --center of the substrate region 304--.

Column 7, Lines 7-8, delete "about thirty-five forty," and replace with --about thirty-five,--.

Column 7, Line 46, delete "axis points," and replace with --axes--.

Column 8, Line 7, delete "effect element," and replace with --effect elements--.

Column 8, Line 8, delete "element scan" and replace with --elements can--.

Signed and Sealed this
Eighth Day of January, 2019

Andrei Iancu
*Director of the United States Patent and Trademark Office*

CERTIFICATE OF CORRECTION (continued)
U.S. Pat. No. 10,012,518 B2

Column 8, Line 58, delete "508 progressively smaller." and replace with --508 becomes progressively smaller.--.

Column 9, Line 20, delete "signal 610" and replace with --signal 610$a$--.

Column 9, Line 44, delete "704$a$," and replace with --604$a$,--.

Column 9, Line 50, delete "effect element" and replace with --effect elements--.

Column 10, Line 1, delete "signal 710" and replace with --signal 710$a$--.

Column 10, Line 14, delete "In the some" and replace with --In some--.

Column 10, Line 23, delete "effect element," and replace with --effect elements,--.

Column 10, Lines 39-40, delete "can received" and replace with --can receive--.

Column 10, Line 45, delete "signal 810" and replace with --signal 810$a$--.

Column 10, Line 58, delete "In the some" and replace with --In some--.

Column 11, Line 2, delete "that a both" and replace with --that both--.

Column 11, Lines 10-11, delete "elements 902, 908," and replace with --elements 902, 904,--.

Column 11, Line 15, delete "generate and amplified" and replace with --generate an amplified--.

Column 11, Line 48, delete "coordinate axes point;" and replace with --coordinate axis point;--.

Column 12, Line 30, delete "coordinate axes point," and replace with --coordinate axis point,--.

Column 13, Line 13, delete "coordinate axes point;" and replace with --coordinate axis point;--.

Column 13, Line 53, delete "coordinate axes point." and replace with --coordinate axis point.--.

Column 14, Line 32, delete "coordinate axes point," and replace with --coordinate axis point,--.

Column 14, Line 35, delete "coordinate axes point." and replace with --coordinate axis point.--.